US012157806B2

(12) United States Patent
Ziebell et al.

(10) Patent No.: US 12,157,806 B2
(45) Date of Patent: Dec. 3, 2024

(54) METHOD OF MAKING COMPOSITE MATRIX VIA INCORPORATION OF CARBON NANOTUBES

(71) Applicant: R.D. Abbott Company, Inc., Garden Cove, CA (US)

(72) Inventors: Rick A. Ziebell, La Habra, CA (US); William Wellman, Norwalk, CA (US)

(73) Assignee: R.D. Abbott Company, Inc.

( * ) Notice: Subject to any disclaimer, the term of this patent is extended or adjusted under 35 U.S.C. 154(b) by 195 days.

(21) Appl. No.: 17/398,977

(22) Filed: Aug. 10, 2021

(65) Prior Publication Data

US 2022/0220276 A1 Jul. 14, 2022

Related U.S. Application Data

(60) Provisional application No. 63/065,087, filed on Aug. 13, 2020.

(51) Int. Cl.
*B82Y 30/00* (2011.01)
*C08K 3/04* (2006.01)

(52) U.S. Cl.
CPC ............... *C08K 3/041* (2017.05); *B82Y 30/00* (2013.01); *C08K 2201/005* (2013.01); *C08K 2201/011* (2013.01)

(58) Field of Classification Search
CPC .... C08K 3/11; C08K 2201/011; C08K 3/013; C08K 3/04; C08K 3/08; C08K 5/0025; C08K 7/28; C08K 9/02; C08K 9/06; C08K 9/10; B82Y 30/00; C08L 83/04
USPC .......................................................... 524/495
See application file for complete search history.

(56) References Cited

U.S. PATENT DOCUMENTS

| | | | |
|---|---|---|---|
| 7,247,670 B2 | 7/2007 | Malenfant et al. | |
| 8,029,734 B2 | 10/2011 | Dai et al. | |
| 9,181,278 B2 | 11/2015 | Kwon et al. | |
| 9,657,211 B1 | 5/2017 | Boday et al. | |
| 9,865,371 B2 | 1/2018 | Hata et al. | |
| 10,121,562 B2 | 11/2018 | Hong et al. | |
| 2006/0234056 A1* | 10/2006 | Huang | H01L 23/373 428/408 |
| 2007/0020319 A1* | 1/2007 | Bougherara | A61L 15/585 424/445 |
| 2007/0259994 A1 | 11/2007 | Tour et al. | |
| 2011/0260116 A1* | 10/2011 | Plee | C08K 3/042 252/511 |
| 2011/0294013 A1 | 12/2011 | Bosnyak et al. | |
| 2013/0030117 A1 | 1/2013 | Song et al. | |
| 2014/0366773 A1 | 12/2014 | Johnson et al. | |
| 2018/0112094 A1 | 4/2018 | Swogger et al. | |

FOREIGN PATENT DOCUMENTS

| | | |
|---|---|---|
| JP | 2017014399 A | 1/2017 |
| WO | WO 2020063799 A1 † | 4/2020 |

OTHER PUBLICATIONS

Chem. Rev. 2010, 110, 5366-5397, Published on Web Jun. 14, 2010, "Current Progress on the Chemical Modification of Carbon Nanotubes," by Nikolaos Karousis, Nikos Tagmatarchis, and Dimitrios Tasis.

Composites Science and Technology 159 (2018) 208-215, Available online Mar. 1, 2018, "Electrically conductive PDMS-grafted CNTs-reinforced silicone elastomer," by Junhua Kong, Yuejin Tong, Jiaotong Sun, Yuefan Wei, Warintorn Thitsartar, Chee Chuan Yeo Jayven, Joseph Kinyanjui Muiruri, Siew Yee Wong, and Chaobin He.

Langmuir 2009, 25(20), 12325-12331, Published on Web Aug. 11, 2009, "Polysiloxane Surfactants for the Dispersion of Carbon Nanotubes in Nonpolar Organic Solvents," by Yan Ji, Yan Y. Huang, Ali R. Tajbakhsh, and Eugene M. Terentjev.

Composites Science and Technology 86 (2013) 129-134, Available online Jul. 24, 2013, "Improvement of carbon nanotubes dispersion by chitosan salt and its application in silicone rubber," by Songmin Shang, Lu Gan, and Marcus Chun-wah Yuen.

Macromolecular Research, vol. 18, No. 8, pp. 766-771 (2010), "Glass Beads-Assisted Fine Dispersion of Multiwalled Carbon Nanotube in Silicone Matrix," by Sung Wook Lim, Eun Young Park, and Kyu Seok Cha.

Silicon (2009) 1:141-145, Published online: Apr. 3, 2009, "Some Issues in Rubber Nanocomposites: New Opportunities for Silicone Materials," by Liliane Bokobza.

European Polymer Journal 43 (2007) 4924-4930, Available online Oct. 6, 2007, "Enhanced electrical conductivity in chemically modified carbon nanotube/methylvinyl silicone rubber nanocomposite," by Mei-Juan Jiang, Zhi-Min Dang, and Hai-Ping Xu.

Composites: Part A 66 (2014) 135-141, Available online Jul. 27, 2014, "Carbon nanotubes based high temperature vulcanized silicone rubber nanocomposite with excellent elasticity and electrical properties," by Songmin Shang, Lu Gan, Marcus Chun-wah Yuen, Shou-xiang Jiang, and Nicy Mei Luo.

Composites: Part A 56 (2014) 290-299, Available online Oct. 24, 2013, "Layered double hydroxide/multiwalled carbon nanotube hybrids as reinforcing filler in silicone rubber," by B. Pradhan and S.K. Srivastava.

Adv. Mater. 2008, 20, 1003-1007, "CH-pi Interactions as the Driving Force for Silicone-Based Nanocomposites with Exceptional Properties," by Alexandre Beigbeder, Mathieu Linares, Myriam Devalckenaere, Philippe Degée, Michael Claes, David Beljonne, Roberto Lazzaroni, and Philippe Dubois.

* cited by examiner
† cited by third party

*Primary Examiner* — Hannah J Pak
(74) *Attorney, Agent, or Firm* — Patent Matters LLC; Irina E. Pomestchenko

(57) ABSTRACT

A method of making a composite matrix via incorporation of CNTs is disclosed. The method comprises: first mixing, with a low shear rate, ingredients comprising CNTs and one or more inorganic surfactants to generate a treated mixture; second mixing ingredients comprising the treated mixture and one or more polymers to generate a composite matrix; and may include curing the composite matrix to obtain a substantially cured composite matrix. The effects arising from individual ingredients and additives in the first and second mixings are studied for various composite matrices.

29 Claims, 30 Drawing Sheets

(DIPHENYLSILOXANE)-DIMETHYLSILOXANE COPOLYMER
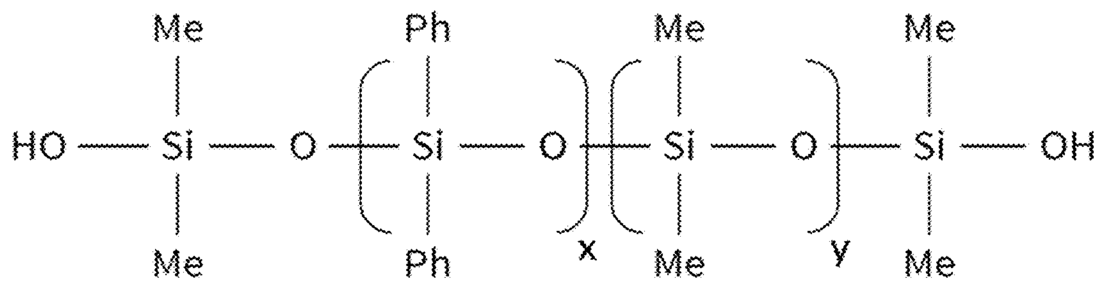
POLYPHENYL- (DIMETHYLHYDROSILOXY)SILOXANE
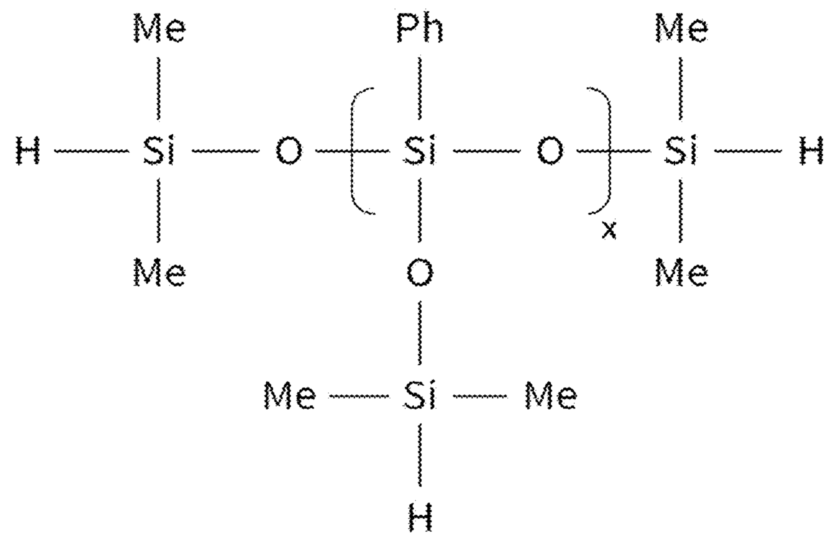
POLYPHENYL- (DIMETHYLPHENYLSILOXY)SILOXANE
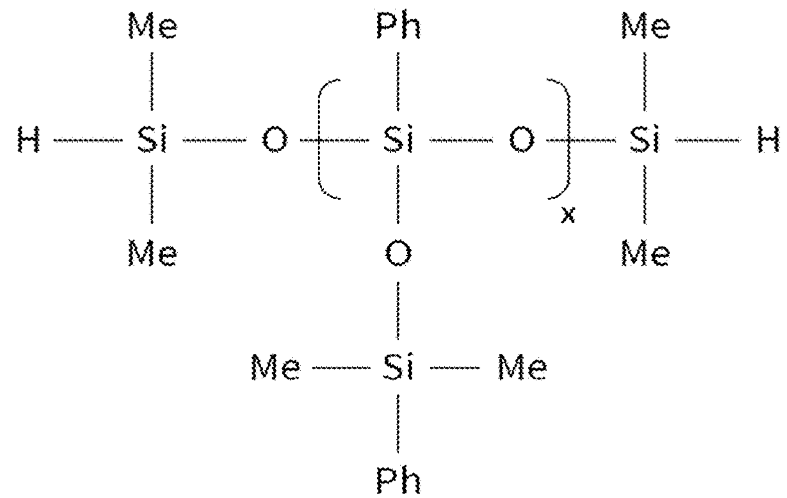
FIG. 3A POLYPHENYL-(TRIMETHYLSILOXY)SILOXANE
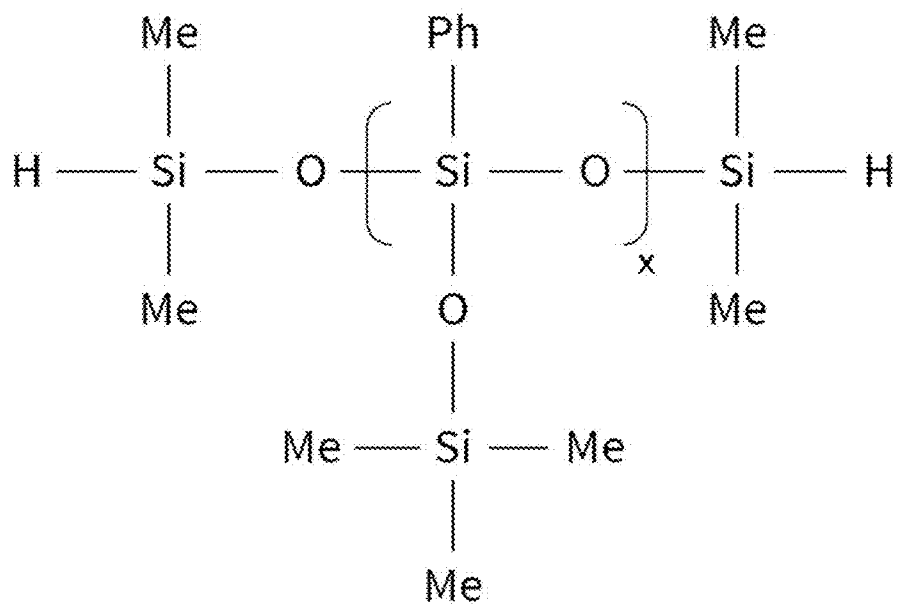
POLY(METHYL-PHENYL) SILOXANE
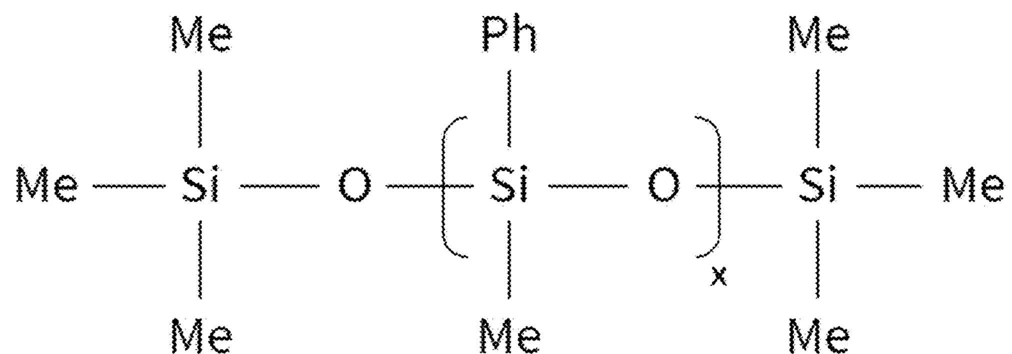
POLYDIPHENYL SILOXANE
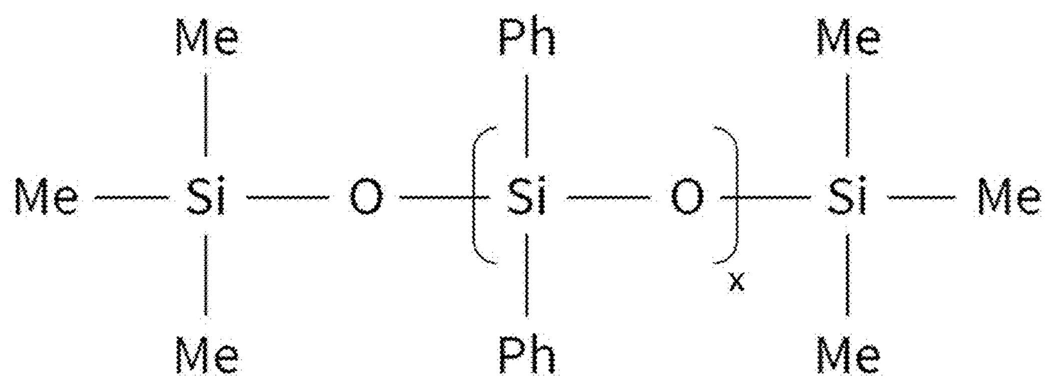
FIG. 3B POLYDIMETHYLSILOXANE
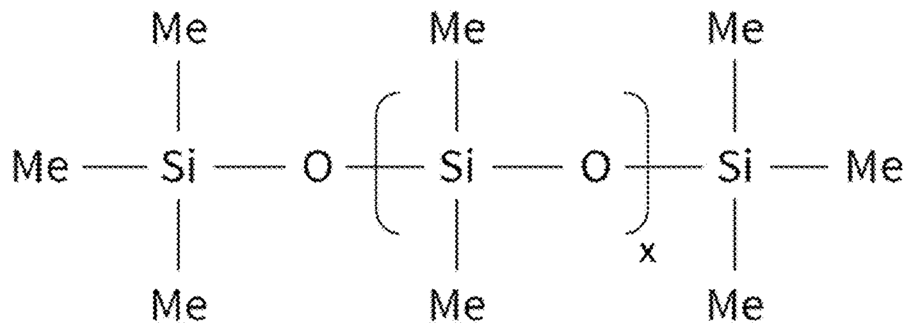
DIPHENYL, PHENYLMETHYL SILOXANE FLUID
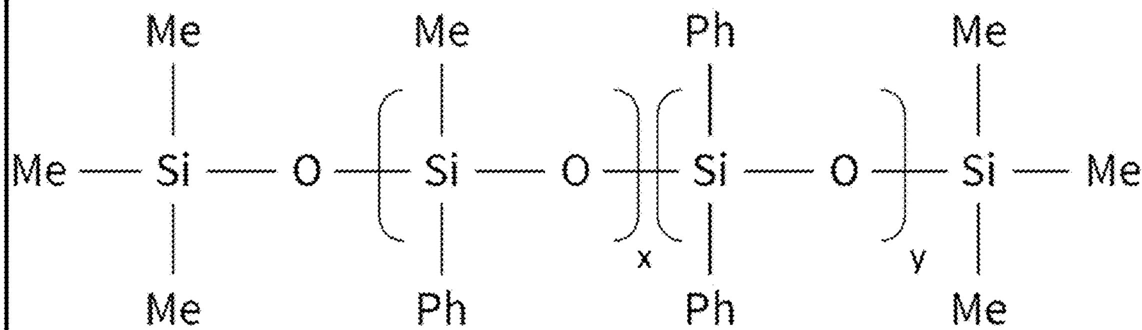
DIMETHYL SILOXANE, DIMETHYLVINYL TERMINATED
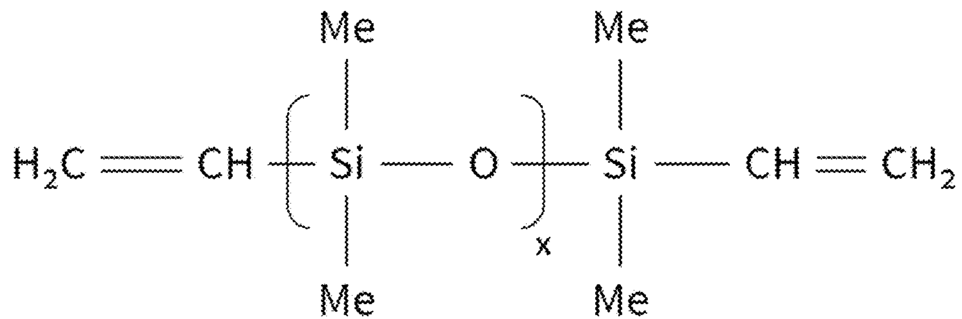
POLYMETHYLHYDROGEN SILOXANE FLUID
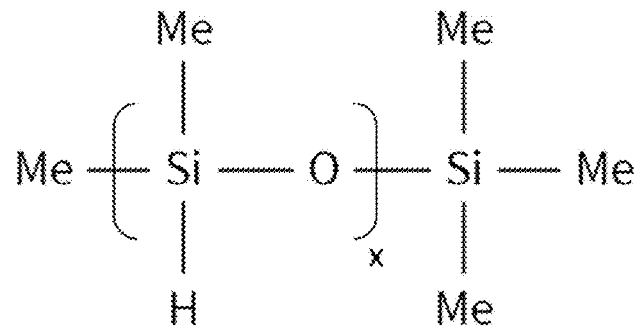
FIG. 3C

DODECAMETHYLCYCLOHEXASILOXANE

PHENYLMETHYLSILOXANE

CARBOXYL FUNCTIONAL SILOXANE

AMINO FUNCTIONAL SILOXANE

EPOXY FUNCTIONAL SILOXANE

FLUOROSILICONE POLYMER

EPOXY AND POLYETHER MODIFIED DIMETHYLSILOXANE

ALKYLARYL POLYSILOXANE FLUID

POLYETHER MODIFIED SILICONE FLUID

POLYETHER FUNCTIONAL POLYSILOXANE

| Treated Mixture 1 | | | |
|---|---|---|---|
| Brand Identification | Ingredient Type | Ingredient Description | Wt% |
| Zeonano SG101 | CNT | >99% SWCNT | 9.0% |
| Denka Li 400 | Carbon Black | Acetylene Carbon Black | 32.0% |
| 3M im30k | Glass Bubbles | Glass Microbubbles | 29.0% |
| Gelest DMS-S14 | Inorganic Surfactant | Silanol Terminated Polydimethylsiloxane | 30.0% |

FIG. 8

| Treated Mixture 2 | | | |
|---|---|---|---|
| Brand Identification | Ingredient Type | Ingredient Description | Wt% |
| Zeonano SG101 | CNT | >99% SWCNT | 9.0% |
| Denka Li 400 | Carbon Black | Acetylene Carbon Black | 32.0% |
| 3M im30k | Glass Bubbles | Glass Microbubbles | 29.0% |
| Gelest DMS-S14 | Inorganic Surfactant | Silanol Terminated Polydimethylsiloxane | 10.0% |
| Gelest DMS-V25 | Inorganic Surfactant | Vinyl Terminated Polydimethylsiloxane | 10.0% |
| Gelest PDV-1625 | Inorganic Surfactant | Vinyl Terminated Diphenylsiloxane Dimethylsiloxane | 10.0% |

FIG. 9

| Base Silicone Rubber Formulation | | | |
|---|---|---|---|
| Brand Identification | Ingredient Type | Ingredient Description | Wt% |
| RBB-2600-35 | Polymer Formulation | Silicone Rubber Base | 95.7% |
| | Cure Modifier | Crosslinker | 2.4% |
| | Cure Modifier | Inhibitor | 0.7% |
| | Catalyst | Platinum Catalyst | 1.2% |

FIG. 10

| Base Fluorosilicone Rubber Formulation | | | |
|---|---|---|---|
| **Brand Identification** | **Ingredient Type** | **Ingredient Description** | **Wt%** |
| LS 2840 | Polymer Formulation | Fluorosilicone Rubber Base | 88.5% |
| RBG-0905 | Polymer | Vinyl Terminated Polydimethylsiloxne | 3.5% |
| | Plasticizer | Mold Release | 0.9% |
| | Cure Modifier | Crosslinker | 2.7% |
| | Cure Modifier | Inhibitor | 2.2% |
| | Catalyst | Platinum Catalyst | 2.2% |

FIG. 11

| Base EPDM Rubber Formulation | | | |
|---|---|---|---|
| **Brand Identification** | **Ingredient Type** | **Ingredient Description** | **Wt%** |
| Keltan 5470 | Polymer | Ethylene Propylene Diene Polymer | 75.2% |
| Sunpar 2280 | Plasticizer | Paraffinic Plasticizer | 15.0% |
| Varox DBPH-50 | Curative | 2,5-dimethyl-2,5-di(tert-butylperoxy)hexane (50%) | 6.0% |
| Zinc Oxide | Filler | ZnO | 3.8% |

FIG. 12

| Base Nitrile Rubber Formulation | | | |
|---|---|---|---|
| **Brand Identification** | **Ingredient Type** | **Ingredient Description** | **Wt%** |
| Perbunan 3965 | Polymer | Butadiene-acrylonitrile copolymer (39% ACN) | 75.0% |
| Paraplex G-25 | Plasticizer | Polyester Sebacate Plasticizer | 15.0% |
| Zinc Oxide | Filler | ZnO | 3.7% |
| Steric Acid | Cure Accelerator | Stearic Acid | 1.5% |
| 5 HS 65% | Curative | Spider Sulfur (65%) | 1.9% |
| DPTT | Curative | Dipentamethylene Thiuram Tetrasulphide | 1.5% |
| MBT | Curative | 2-Mercaptobenzothiazole | 1.3% |

FIG. 13

Table A1:

| Matrix Type | Formulation Details | | | | |
|---|---|---|---|---|---|
| | Treated Mixture Type | Treated Mixture wt% | Effective SWCNT wt% | Effective Carbon Black wt% | Effective Glass Bubble wt% |
| Base Silicone Rubber Formulation | N/A | 0 | 0 | 0 | 0 |
| 1wt% Eff SWCNT | 1 | 11.1 | 1 | 3.1 | 3.2 |
| 2wt% Eff SWCNT | 1 | 22.2 | 2 | 7.1 | 6.4 |
| 3wt% Eff SWCNT | 1 | 33.3 | 3 | 10.7 | 9.7 |

Table A1 Continued:

| Electrical | Physical | | | | Rheological | | | |
|---|---|---|---|---|---|---|---|---|
| Volume Resistivity (ohm*cm) | Durometer (Shore A) | Tensile (psi) | Elongation (%) | Tear (lbf/in) | ML (lb-in) | MH (lb-in) | TS2 (seconds) | TC90 (seconds) |
| 4.40E+13 | 38 | 1090 | 968 | 152 | 1.593 | 10.309 | 8.3 | 19.5 |
| 1.67E+12 | 46 | 854 | 1340 | 152 | 1.377 | 10.255 | 11.5 | 17.6 |
| 5.85E+04 | 57 | 558 | 1072 | 139 | 2.083 | 12.548 | 12.6 | 25.8 |
| 3.54E+04 | 60 | 363 | 368 | 110 | 3.442 | 11.028 | 15.8 | 40.5 |

FIG. 14

Table A2:

| | Formulation Details | | | | |
|---|---|---|---|---|---|
| Matrix Type | Treated Mixture Type | Treated Mixture wt% | Effective SWCNT wt% | Effective Carbon Black wt% | Effective Glass Bubble wt% |
| Base Silicone Rubber Formulation | N/A | 0 | 0 | 0 | 0 |
| 1wt% Eff SWCNT | 2 | 11.1 | 1 | 3.1 | 3.2 |
| 2wt% Eff SWCNT | 2 | 22.2 | 2 | 7.1 | 6.4 |
| 3wt%Eff SWCNT | 2 | 33.3 | 3 | 10.7 | 9.7 |

Table A2 Continued:

| Electrical | Physical | | | | Rheological | | | |
|---|---|---|---|---|---|---|---|---|
| Volume Resistivity (ohm*cm) | Durometer (Shore A) | Tensile (psi) | Elongation (%) | Tear (lbf/in) | ML (lb-in) | MH (lb-in) | TS2 (seconds) | TC90 (seconds) |
| 4.40E+13 | 38 | 1090 | 968 | 152 | 1.593 | 10.309 | 8.3 | 19.5 |
| 3.30E+14 | 45 | 775 | 925 | 130 | 1.757 | 12.96 | 9.1 | 15.6 |
| 1.10E+06 | 55 | 506 | 682 | 113 | 2.833 | 16.704 | 9.6 | 18 |
| 5.52E+04 | 63 | 352 | 350 | 108 | 3.893 | 14.876 | 14.8 | 70.7 |

FIG. 15

Table B:

| | Formulation Details | | | | |
|---|---|---|---|---|---|
| Matrix Type | Treated Mixture Type | Treated Mixture wt% | Effective SWCNT wt% | Effective Carbon Black wt% | Effective Glass Bubble wt% |
| Base Silicone Rubber Formulation | N/A | 0 | 0 | 0 | 0 |
| 1wt% Raw SWCNT | N/A | 0 | 1 | 0 | 0 |
| 2wt% Raw SWCNT | N/A | 0 | 2 | 0 | 0 |
| 3wt% Raw SWCNT | N/A | 0 | 3 | 0 | 0 |

Table B Continued:

| Electrical | Physical | | | | Rheological | | | |
|---|---|---|---|---|---|---|---|---|
| Volume Resistivity (ohm*cm) | Durometer (Shore A) | Tensile (psi) | Elongation (%) | Tear (lbf/in) | ML (lb-in) | MH (lb-in) | TS2 (seconds) | TC90 (seconds) |
| 4.40E+13 | 38 | 1090 | 968 | 152 | 1.593 | 10.309 | 8.3 | 19.5 |
| 9.71E+14 | 43 | 842 | 1219 | 173 | 1.931 | 11.325 | 8.2 | 22.5 |
| 2.95E+14 | 51 | 774 | 970 | 171 | 2.952 | 13.796 | 7.9 | 32.6 |
| 1.87E+06 | 57 | 752 | 754 | 176 | 3.984 | 16.128 | 7.8 | 28.9 |

FIG. 16

Table C:

| | Formulation Details | | | | |
|---|---|---|---|---|---|
| Matrix Type | Treated Mixture Type | Treated Mixture wt% | Effective SWCNT wt% | Effective Carbon Black wt% | Effective Glass Bubble wt% |
| Base Silicone Rubber Formulation | N/A | 0 | 0 | 0 | 0 |
| Silicone 1wt% Raw SWCNT 3.1wt% Raw CB | N/A | 0 | 1 | 3.1 | 0 |
| Silicone 2wt% Raw SWCNT 7.1wt% Raw CB | N/A | 0 | 2 | 7.1 | 0 |

Table C Continued:

| Electrical | Physical | | | | Rheological | | | |
|---|---|---|---|---|---|---|---|---|
| Volume Resistivity (ohm*cm) | Durometer (Shore A) | Tensile (psi) | Elongation (%) | Tear (lbf/in) | ML (lb-in) | MH (lb-in) | TS2 (seconds) | TC90 (seconds) |
| 4.40E+13 | 38 | 1090 | 968 | 152 | 1.593 | 10.309 | 8.3 | 19.5 |
| 9.71E+14 | 44 | 837 | 898 | 155 | 1.438 | 12.288 | 9.8 | 18.3 |
| 3.89E+14 | 51 | 722 | 746 | 161 | 2.028 | 14.656 | 8.3 | 20 |

FIG. 17

Table D:

| Matrix Type | Treated Mixture Type | Treated Mixture wt% | Effective SWCNT wt% | Effective Carbon Black wt% | Effective Glass Bubble wt% |
|---|---|---|---|---|---|
| Base Fluorosilicone Rubber Formulation | N/A | 0 | 0 | 0 | 0 |
| 1wt% Eff SWCNT | 1 | 11.1 | 1 | 3.5 | 3.2 |
| 2wt% Eff SWCNT | 1 | 22.2 | 2 | 7.1 | 6.4 |
| 3wt% Eff SWCNT | 1 | 33.3 | 3 | 10.7 | 9.7 |

Table D Continued:

| Electrical | Physical | | | | Rheological | | | |
|---|---|---|---|---|---|---|---|---|
| Volume Resistivity (ohm*cm) | Durometer (Shore A) | Tensile (psi) | Elongation (%) | Tear (lbf/in) | ML (lb-in) | MH (lb-in) | TS2 (seconds) | TC90 (seconds) |
| 4.01E+10 | 40 | 775 | 650 | 159 | 1.429 | 4.354 | 90.9 | 225.2 |
| 1.25E+06 | 51 | 257 | 378 | 77 | 1.91 | 4.406 | 152.1 | 250.5 |
| 4.27E+04 | 58 | 206 | 54 | 67 | 2.845 | 6.312 | 19.1 | 130.5 |
| 3.32E+04 | 64 | 200 | 32 | 32 | 3.933 | 7.348 | 46.8 | 221.1 |

FIG. 18

Table E:

| | Formulation Details | | | | |
|---|---|---|---|---|---|
| Matrix Type | Treated Mixture Type | Treated Mixture wt% | Effective SWCNT wt% | Effective Carbon Black wt% | Effective Glass Bubble wt% |
| Base EPDM Rubber Formulation | N/A | 0 | 0 | 0 | 0 |
| 0.9wt% Eff SWCNT | 1 | 10 | 0.9 | 3.2 | 2.9 |
| 1.7wt% Eff SWCNT | 1 | 18.9 | 1.7 | 6 | 5.5 |
| 3wt% Eff SWCNT | 1 | 33.3 | 3 | 10.7 | 9.7 |

Table E Continued:

| Electrical | Physical | | | | Rheological | | | |
|---|---|---|---|---|---|---|---|---|
| Volume Resistivity (ohm*cm) | Durometer (Shore A) | Tensile (psi) | Elongation (%) | Tear (lbf/in) | ML (lb-in) | MH (lb-in) | TS2 (seconds) | TC90 (seconds) |
| 2.10E+10 | 49 | 339 | 231 | 79 | 1.638 | 23.621 | 36.9 | 255.5 |
| 6.13E+14 | 52 | 430 | 403 | 92 | 1.736 | 26.103 | 32.5 | 249.3 |
| 5.17E+14 | 56 | 834 | 582 | 129 | 2.056 | 27.707 | 29.7 | 242.9 |
| 8.76E+07 | 65 | 949 | 408 | 185 | 2.563 | 27.039 | 26.8 | 232.6 |

FIG. 19

Table F:

| | Formulation Details | | | | |
|---|---|---|---|---|---|
| Matrix Type | Treated Mixture Type | Treated Mixture wt% | Effective SWCNT wt% | Effective Carbon Black wt% | Effective Glass Bubble wt% |
| **Table F** | | | | | |
| Base Nitrile Rubber Formulation | N/A | 0 | 0 | 0 | 0 |
| 0.9wt% Eff SWCNT | 1 | 1 | 0.9 | 3.2 | 2.9 |
| 2wt% Eff SWCNT | 1 | 22.2 | 2 | 7.1 | 6.4 |
| 3wt% Eff SWCNT | 1 | 33.3 | 3 | 10.7 | 9.7 |

Table F Continued:

| Electrical | Physical | | | | Rheological | | | |
|---|---|---|---|---|---|---|---|---|
| Volume Resistivity (ohm*cm) | Durometer (Shore A) | Tensile (psi) | Elongation (%) | Tear (lbf/in) | ML (lb-in) | MH (lb-in) | TS2 (seconds) | TC90 (seconds) |
| | | | | | | | | |
| 1.13E+14 | 50 | 416 | 486 | 66 | 0.891 | 10.989 | 18.9 | 126.4 |
| 1.02E+08 | 54 | 463 | 354 | 93 | 1.261 | 17.904 | 16.4 | 111.8 |
| 5.72E+04 | 65 | 1010 | 397 | 161 | 1.935 | 20.988 | 15 | 109 |
| 4.07E+04 | 74 | 1067 | 233 | 204 | 3.235 | 19.875 | 13.7 | 28.3 |

FIG. 20

METHOD OF MAKING COMPOSITE MATRIX VIA INCORPORATION OF CARBON NANOTUBES

CROSS-REFERENCE TO RELATED APPLICATIONS

This application claims the benefit of U.S. Provisional Application No. 63/065,087 filed on Aug. 13, 2020, the disclosure of which is incorporated herein by reference in its entirety.

BACKGROUND

Carbon nanotubes (CNTs), which resemble, but are not made from, rolled-up graphene sheets, exhibit unique physical and chemical properties that emerge as a direct result of their structure. This structure in turn results from the chiral vector from which the nanotube could be formed if it were constructed from an actual two-dimensional graphene sheet. The bonding arrangement of graphene, a plane of conjugated hexagonal carbon atoms, restricts the nanotube to three possible types, which are termed as 'zigzag,' 'armchair,' or 'chiral;' each type shows unique electrical properties. For example, the armchair type is highly conductive, and the zigzag and chiral types are semiconductive.

Both single-walled carbon nanotubes (SWCNTs) and multi-walled carbon nanotubes (MWCNTs) can be produced, with the latter containing at least one, but often many, concentric SWCNTs. Conditions in synthesis lead to differences in tube length and diameter distributions, as well as to the presence of carbonaceous byproduct or transition metal catalyst impurities. But, regardless of these variations, and in part due to the inherent chemistry of CNTs, the scaled up production methods yield bundles of hundreds to thousands of intertwined, rather than discrete, CNTs. The inter-tube attraction responsible for these bundles is considered to be the most significant hurdle towards fully exploiting the CNT's desirable properties when incorporating them into a polymer.

As isolated objects, CNTs have been primarily the focus of academic studies; however, when incorporated into a polymer to form a composite they then find utility in functional applications. Upon incorporation, as-manufactured CNTs can impart a portion of their properties to the encapsulating matrix. This imbuement is drastically improved when (1) the strong van der Waals forces binding the tubes are disrupted, and as a result, they are homogeneously dispersed throughout the matrix, and (3) when the CNT/matrix interfacial attractive interaction is maximized. Two key strategies toward accomplishing these goals have emerged: covalent functionalization of the CNT surface and non-covalent functionalization of the CNT surface.

Covalent functionalization typically involves the breaking of the CNT's conjugated system and the subsequent addition of a functional group (carboxylic, amino, or other). While this functionalization can generate stronger attractive interaction in the composite (as well as with other resident fillers), it comes at a cost. Covalent functionalization entails the conversion of a primarily $sp^2$ hybridized system to a system that contains $sp^3$ hybridized localities, with the concentration of these localities growing commensurately with the degree of functionalization. Furthermore, it has been reported that the harsh chemical treatment necessary to attach these moieties often leads to drastically reduced nanotube aspect ratios, which severely limit their practical usage as fillers in matrices. To this day, very few, if any, methods have been devised to implement the covalent functionalization methods at production scale.

Non-covalent functionalization offers an alternative approach for exfoliating and incorporating CNTs into a polymer matrix without sacrificing their structure or electron transport capabilities. The non-covalent approach involves solvents, preferably surfactants, capable of penetrating the gaps between the bundled CNTs and securing their solubilized colloidal stability. This mechanism of physical adsorption, rather than chemical reaction, preserves the conjugated structure of the nanotubes; it materializes from a collection of interactions, including, but not limited to, van der Waals, $\pi$-$\pi$, and CH-$\pi$.

Several non-covalent functionalization methods have been reported. It has been shown that the favorable interactions afforded by appropriate solvent and surfactant choice facilitate the exfoliation and stability of unbundled nanotubes. The effectiveness of this technique is further enhanced when the process involves a mixing step with high shear rates; however, an overly intense shear rate (e.g., high power jet mixing, ultrasonication, etc.) will reduce the aspect ratio of the nanotubes as well as introduce undesirable impurities along nanotube sidewalls and endcaps, thereby partially negating the benefits of the method.

In view of the above difficulties associated with incorporating CNTs for use in practical applications, this document describes a new method to make composite matrices such as rubber compounds at production scale, based on streamlining the non-covalent functionalization of CNTs with various processing techniques. The method described herein is especially useful for inexpensively producing electrically conductive composite matrices that retain their elastomeric properties.

BRIEF DESCRIPTION OF THE DRAWINGS

FIGS. 3A-3D provide a list showing examples of the inorganic surfactants, where Me (methyl group)=$CH_3$ and Ph (phenyl group)=$C_6H_5$.

FIGS. 8 and 9 are tables listing the ingredients used to generate Treated Mixture 1 and Treated Mixture 2, respectively.

FIGS. 10-13 are tables listing the ingredients used in the second mixing, other than the treated mixture, for generating a base silicone rubber, a base fluorosilicone rubber, a base EPDM rubber, and a base nitrile rubber, respectively.

FIGS. 14-20 are tables listing the experimental results related to electrical, physical, and rheological properties of various base rubbers and composite matrices (with Treated Mixture 1 or 2)

DETAILED DESCRIPTION

In the present study, non-covalent treatments of carbon nanotubes (CNTs) are considered, and mixtures thereof are generated. The resultant treated mixture is then mixed with a polymer to obtain a composite matrix. The composite matrix may be further processed to produce finished products. The process steps are configured to achieve the production scale fabrication of polymer-based products such as high-performance rubber compounds. The initial treatments impart a conditioning that exfoliates and debundles the CNT bundles to mostly individual tubes. Other additives may be included in the treated mixture to produce the finished products with enhanced electrical, thermal, mechanical, and other properties. Some examples of the present implementations and applications are explained below. Although specific values are cited herein to explain various steps, experiments and results, it should be understood that these are example values, approximate values, and/or values within instrumental tolerances or resolutions, as can be understood by one with ordinary skill in the art.

Figure 1:
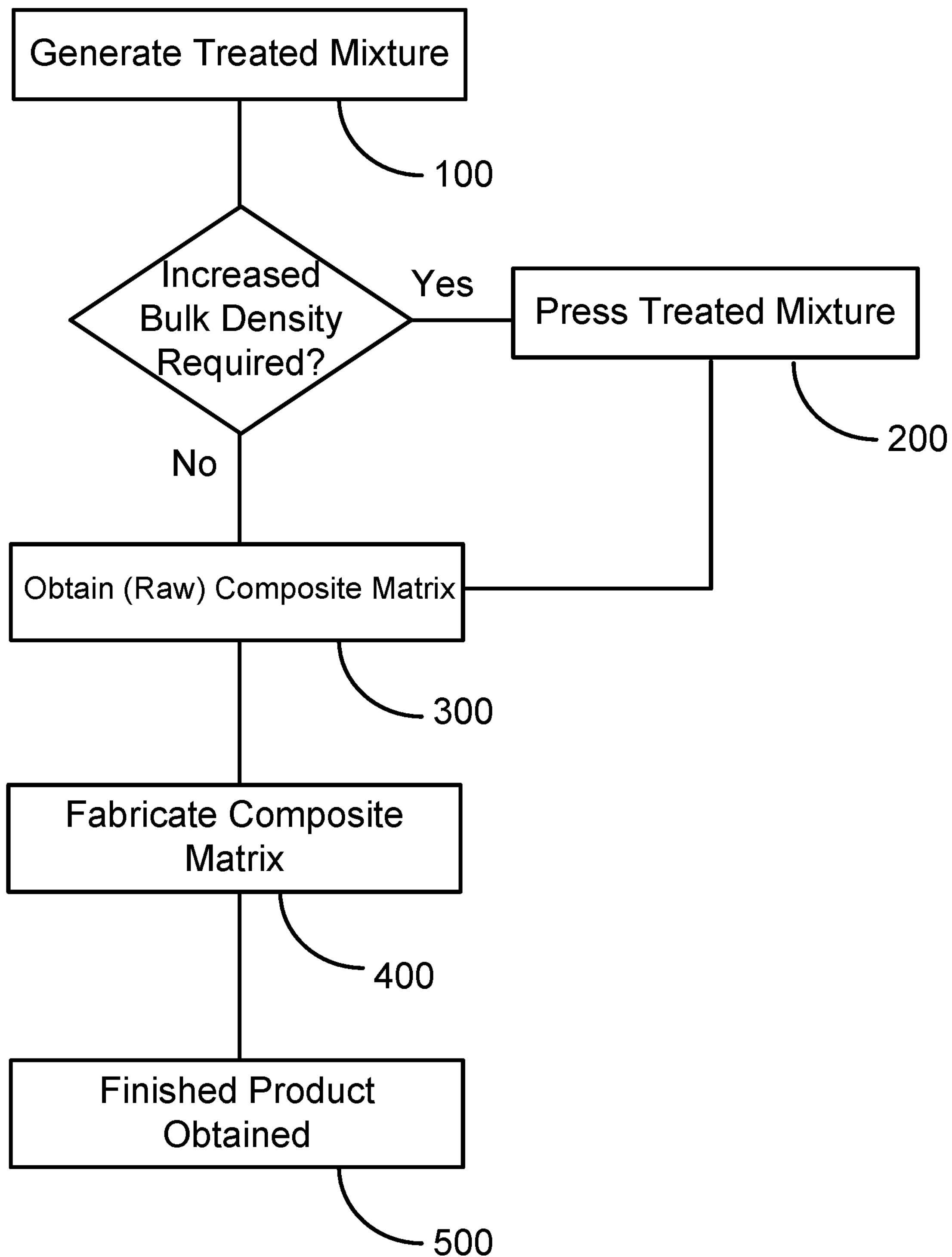
FIG. 1 is a flowchart illustrating an overview of the entire production process.

FIG. 1 is a flowchart illustrating an overview of the entire production process. First, in step 100, a treated mixture is generated by dispersing CNTs by non-covalent functionalization into one or more inorganic surfactants, with or without additives. Details of step 100 as to how the treated mixture is obtained are explained later with reference to FIG. 2. The resultant treated mixture can then be used in as-generated or pressed form. The pressing may include compression, pelletization, and other bulk density-increasing operations. The pressed form is often required for efficient transportation or shipping. Accordingly, in step 200, pressing of the treated mixture may be carried out when it is required. Details of the pressing operations and their effects are explained later with reference to FIGS. 6A and 6B. In step 300, a composite matrix is obtained by mixing ingredients including the treated mixture and one or more polymers, with or without additives. Details of step 300 as to how the composite matrix is generated are explained later with reference to FIG. 4. After obtaining the composite matrix, fabrication procedures of the composite matrix are often required depending on the type of finished products; examples of the fabrication procedures include molding, calendering, and extrusion. In step 400, fabrication of the composite matrix by using one or more of the above fabrication procedures is carried out. In step 500, the finished product with required properties is thus obtained from the composite matrix. It should be noted that, according to the present method of making a composite matrix via incorporation of CNTs, various steps in the processes shown in the flowcharts do not have to be in the order that is shown; they can be interchanged, sequenced differently, or carried out in parallel, depending on efficiency of operations, convenience of applications or any other scenarios.

Figure 2:
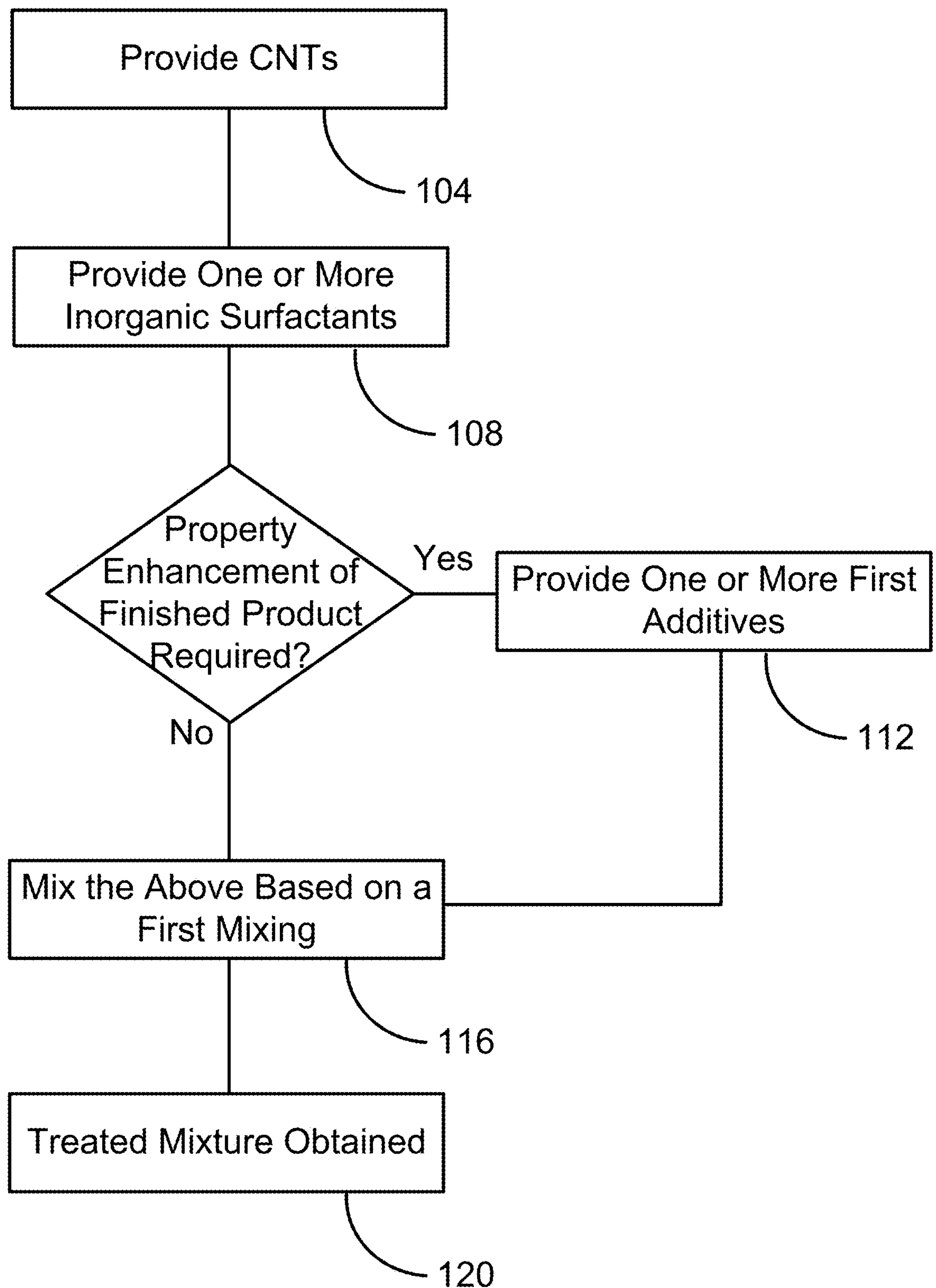
FIG. 2 is a flowchart illustrating the details of the step 100, where the treated mixture is generated.

FIG. 2 is a flowchart illustrating the details of step 100, where the treated mixture is generated. In steps 104-112, the necessary ingredients are provided. In step 104, CNTs are provided. In general, CNTs include single-walled carbon nanotubes (SWCNTs), double-walled carbon nanotubes (DWCNTs), multi-walled carbon nanotubes (MWCNTs), and impurities. To achieve high-quality finished products, a batch of high purity SWCNTs is used for the present process. For instance, the CNTs may comprise at least 99% of single-walled carbon nanotubes (SWCNTs) in powder form. Examples include but are not limited to the SWCNT powder manufactured by Zeon Nano Technology Co., Ltd, ZEONANO® SG101, which has a carbon purity of 99% or higher, an impurity concentration of less than 1%, and a high aspect ratio (an average diameter of 3-5 nm and a length of 100-600 μm).

In general, a batch of raw CNTs off-the-shelf contains bundled CNTs. Thus, the procedure employed to disperse CNTs in a solution has a significant impact on the final suspension characteristics, thereby affecting the electrical and thermal conductivities, especially in high-performance composite matrices. As mentioned earlier, a number of technical approaches, including covalent and non-covalent functionalization of CNTs, can be adopted to prepare a stable and homogeneous dispersion of CNTs. In the present process, the non-covalent approach is employed since the surface structure and electrical conductivities of the CNTs remain substantially intact. Specifically, it is possible to exfoliate and debundle the bundled CNTs without substantially sacrificing the structure and electron transport capabilities inherent in individual CNTs via non-covalent functionalization. This is because the non-covalent approach utilizes solvents or surfactants capable of penetrating the gaps between the bundled CNTs through the mechanism of physical adsorption, rather than chemical reaction, thereby substantially preserving the structure and electrical properties inherent in individual CNTs.

In step 108, one or more inorganic surfactants are provided to carry out the non-covalent functionalization of the CNTs. Specifically, a combination of two or more fluid polymers or a single fluid polymer can be selected to optimally facilitate attraction to and adsorption along the surfaces of CNTs. Each of these fluid polymers may comprise a linear, branched, or cyclic polysiloxane backbone and contains pendant or terminal substituents. These substituents can be selected to complement each other in their interaction with CNTs. It has been reported that certain moieties strongly interact with then-electron rich surfaces of CNTs; thus, the less bulky moieties can penetrate the interstices of CNT bundles, thereby facilitating their exfoliation and debundling. Here, "moieties" are branches in organic or inorganic molecules that extend from the carbon or siloxane backbone, including: the methyl group ($CH_3$), the hydroxyl group (COH), silanol group (SiOH), the aryl group (such as phenyl and naphthyl groups), or a combination thereof. FIGS. 3A-3D provide a list showing examples of the inorganic surfactants, where Me (methyl group)=$CH_3$ and Ph (phenyl group)=$C_6H_5$.

As mentioned above, the present study has shown that one or more inorganic surfactants, such as a vinyl terminated polydimethylsiloxane, a vinyl terminated diphenylsiloxane dimethylsiloxane, a silanol terminated polydimethylsiloxane, a hydride terminated polyphenyl-(dimethylhydrosiloxy)siloxane, a hydride terminated polyphenylmethylsiloxane, a hydride terminated polyphenyl-(dimethyl siloxy) siloxane, or a combination thereof, can efficiently penetrate bundled CNTs and adsorb along the surfaces of individual CNTs. These polysiloxane based fluid polymers show a viscosity ranging from 0.01 to 10 Pa-s measured at 25° C., with the actual viscosity corresponding to the molecular weight of the polymer. In some cases, a combination of a low viscosity fluid polymer (e.g., silanol terminated) and a higher viscosity fluid polymer (e.g., phenylated) is expected to adsorb onto individual CNTs more efficiently than when using only a low viscosity or only a higher viscosity fluid polymer. As described later, the present study has shown that optimal results can be obtained when a silanol terminated fluid polymer, e.g., silanol terminated polydimethylsiloxane, is used as a single inorganic surfactant, rather than using a combination of two or more different inorganic surfactants. It is preferable that the weight percentage of CNT is low in a mixture of the CNT and one or more inorganic surfactants, because CNTs are still expensive in today's market. In one example, 23 wt % CNT and 77 wt % silanol terminated polydimethylsiloxane are used.

Figure 3D:
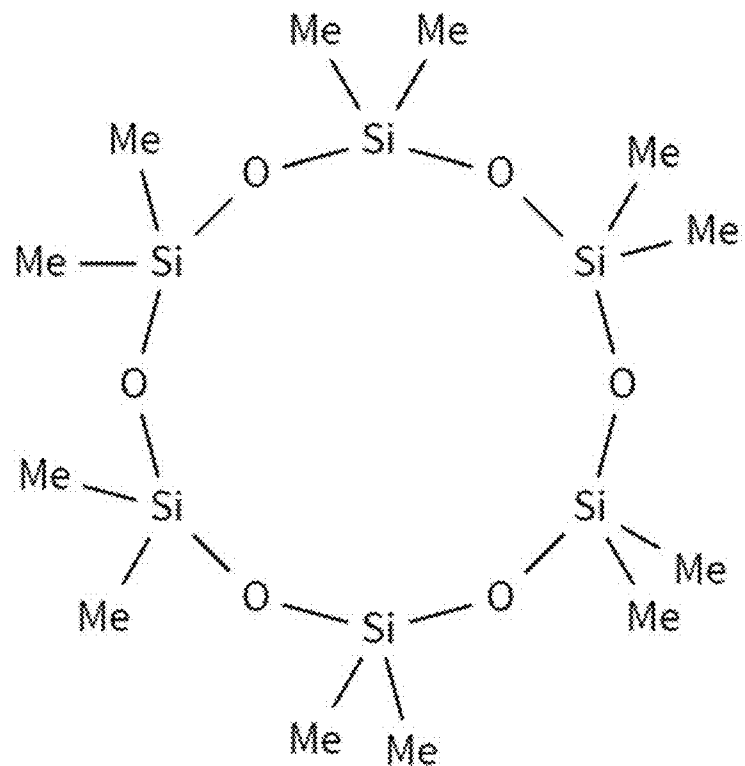
Figure 3E:
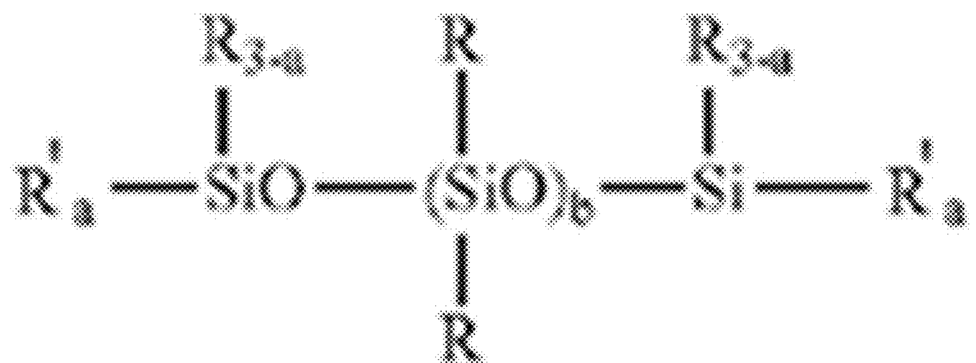
FIGS. 3E, 3F, and 3G illustrate generalized molecular descriptions of a linear polysiloxane, a branched polysiloxane, and a cyclic polysiloxane, respectively.
Figure 3F:
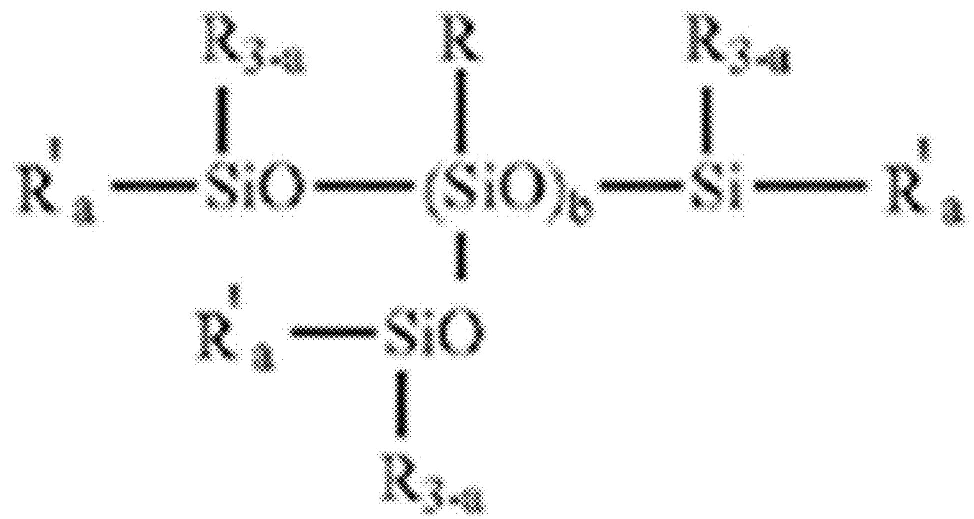
Figure 3G:
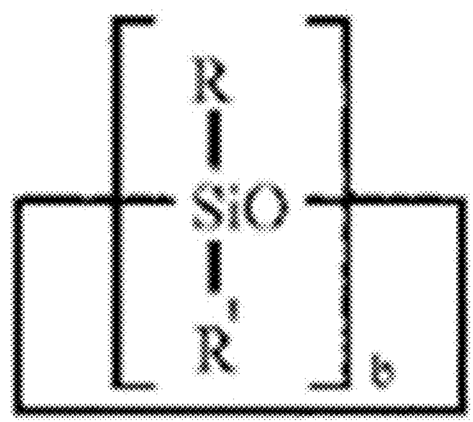

FIGS. 3E, 3F, and 3G illustrate generalized molecular descriptions of the above surfactants, i.e., a linear polysiloxane, a branched polysiloxane, and a cyclic polysiloxane, respectively, where a is an integer from 0 to 3, and b has a value sufficient to satisfy the above described viscosity, wherein in any of the above examples R can include a substituted or unsubstituted hydrocarbon group having 1 to 12 carbon atoms in general, preferably 1 to 5 carbon atoms, e.g., alkyl groups such as methyl, ethyl, propyl, isopropyl, butyl, isobutyl, tert-butyl, hexyl, cyclohexyl, octyl and dodecyl; aryl groups such as phenyl and tolyl; and halogen-substituted hydro-carbon groups such as 3,3,3-trifluoropropyl. The examples of R' are alkyl, alkenyl, phenyl, hydride, and hydroxyl groups, and the selection is made to maximize the desired non-covalent interactions with CNTs.

Depending on the properties required in the finished product, one or more additives may be provided in step 112 as ingredients of the treated mixture to enhance the specific properties. Thus, the first mixing in step 116 can be carried out to mix the CNTs and one or more inorganic surfactants, with or without one or more additives, which are herein termed first additives. Each of some possible first additives is explained below.

One or more cure modifiers may be added as the first additives to generate the treated mixture. It has been reported that CNTs, when untreated, can interfere with common (platinum-based, peroxide-based, or sulfur-based) rubber cure systems. Here, a "rubber cure system" refers to the chemical ingredients included in a rubber formulation that enable the formation of a thermoset after a curing procedure, e.g., application of heat and/or pressure. This interference can be seen in cure profiles as well as finished products. This is specifically seen in a certain type of cured silicone rubber, e.g., platinum cured silicone rubber having silicon-hydride crosslinkers, that undergo hydrosilylation cure reactions. Details related to optimizing hydrosilylation cure reactions in silicone rubber are explained later in this document, wherein the CNT encapsulation in the composite matrix is improved.

The addition of one or more cure modifiers depends on the type and required properties of the finished article. Furthermore, they can be added, if needed, at the later stage of the process, e.g., just before the curing process. It should be noted, however, that incorporation of the needed cure modifiers in the treated mixture from the outset makes the preparation stage integrative, thereby further streamlining the entire process, in addition to improving the CNT encapsulation in the composite matrix.

Carbon black may be added as the first additive to generate the treated mixture. Carbon black is a material produced by the incomplete combustion of petroleum products and has a form of para-crystalline carbon. It is conventionally used as a reinforcing filler in tires and other rubber products. Examples of a high-purity, conductive grade of carbon black include Tokai Black #5500 (from Tokai headquartered in Japan) and Denka Black Li-400 (from Denka headquartered in Japan), which are acetylene-based. In general, when conductive black fillers such as CNTs or carbon blacks are dispersed in insulating polymers, the electrical percolation threshold is characterized by a sharp drop, by several orders of magnitude, in the electrical resistance. The electrical percolation threshold is associated with the formation of an interconnecting conductive network of fillers in the host medium. As compared to a medium filled only with carbon black, a medium containing only CNTs that exhibit a much higher aspect ratio, can attain an electrical percolation threshold at a much lower filler percentage. However, it has been reported that incorporation of both CNTs and carbon blacks in the host medium produces synergistic effects arising from each participating in the formation of the interconnecting conductive network. As shown in the later described examples, the carbon black added in the treated mixture functions synergistically with the CNTs to bridge electron transport pathways and enhance the electrically conductive network in the composite matrix, more than in the case of including only CNTs.

A partitioning agent may be added as the first additive to generate the treated mixture. Examples of nano- or micro-scale partitioning agents include glass beads, glass bubbles, and electrically conductive metal powders. Examples of such partitioning agents include 3M™ Glass Bubbles iM30K and Glass Bubbles iM16K (from 3M headquartered in the USA). The addition of these ingredients is expected to facilitate unbundling of CNTs during the subsequent first mixing stage 116 due to a ball-bearing grinding effect. Additionally, it has been reported that incorporation of glass beads (GB) in the combination of silicone and MWCNTs significantly improves the dispersion of MWCNTs in the silicone; specifically, the electrical conductivity of the silicone/MWCNT/GB composite was approximately two times higher than that of the composite without GBs due to the improved distribution uniformity of MWCNTs in the silicone. Furthermore, the presence of GBs is expected to improve the mechanical properties, such as the tensile strength and elongation at break of the composite, in addition to the electrical conductivity. As shown in the later described examples, the partitioning agent, e.g., glass bubbles, added in the treated mixture improves the distribution uniformity of the CNTs, e.g., SWCNTs, thereby enhancing the electrical conductivity and the mechanical properties in the composite matrix.

A concentrating agent or a blowing agent may be added as the first additive to generate the treated mixture. Examples of concentrating or blowing agents include foaming agents, composites containing expandable cells, and other void-changing agents, which function to increase void space and enhance the interconnecting conductive network and improve the electrical conductivity in the composite matrix. Examples of thermally expandable thermoplastic microspheres comprise a polymer shell made from ethylenically unsaturated monomers encapsulating a propellant commonly known by the brand Expancel® Microsphere Products (from Nouryon headquartered in the Netherlands). In view of the entire process flow, the expanding spheres are added to generate the treated mixture in the first mixing 116, then the treated mixture is mixed with one or more polymers in the second mixing 316, then during the process, the spheres first expand upon heating, then the curing 320 of the composite matrix results in locking the expanded cells permanently. It has been shown that blowing agents, such as those based on azodicarbonamide and p-p'-oxybis (benzenesulfonyl hydrazide) accelerated with treated urea provide micro-formation and cellular structure in cured-fabricated articles. These agents can be added as the first additives to generate the treated mixture in like manner to the composites containing expandable cells. In silicones specifically, foaming agents can be used to create void spaces upon heating and cure during the process. These agents include a combination of water, silicon-hydride crosslinkers, and phenyl silicone. The phenyl silicone fluid is selected from those comprised of a linear polysiloxane chain where pendant groups of methyl-phenyl or diphenyl are substituted with dimethyl along the polysiloxane backbone and has a viscosity measured at 23° C., of 0.01 to 10 Pa-s. When added to generate the treated mixture and then incorporated into the polymer matrix, these agents, upon curing, will efficiently foam the composite matrix through the creation of many nucleation sites that give rise to the generation of micro-foaming bubbles that grow to maintain a surface skin.

After the provisions of all the necessary ingredients in step 104-112 above, the ingredients are put in a first mixer and mixed therein in the first mixing step 116 of FIG. 2. The first mixer can be a cone mixer or a pin mixer with a simple mixing mechanism. The present experimentations revealed that using a mixer with a low shear rate in the range of 100-100,000 l/s for a duration in the range of 5 minutes~1 hour gives rise to gentle debundling of the CNTs. In step 120, the treated mixture having well dispersed and substantially undamaged CNT's is thus obtained.

In general, the conventional mixing methods for non-covalent functionalization include the use of a jet mixer, a sonicator, or other high-cost, high-power machines with high shear rates; i.e. shear rates above 100,000 l/s. For example, typical shear rates produced by jet mixers are more than 100,000 l/s, which often damage CNTs. Sonication applied by sonicators also shortens the CNTs, thereby reducing the aspect ratio and significantly diminishing their usefulness as an electrically conductive filler. Furthermore, the sonication naturally generates heat, requiring cooling during the procedure. In contrast, as explained with reference to the first mixing step 116 above, a mixer with low shear rates in the range of 100-100,000 l/s is employed in the present process for mixing the CNTs and other ingredients to obtain a treated mixture that contains substantially debundled CNTs with minimal breakage, with high-quality dispersion characteristics.

Figure 4:
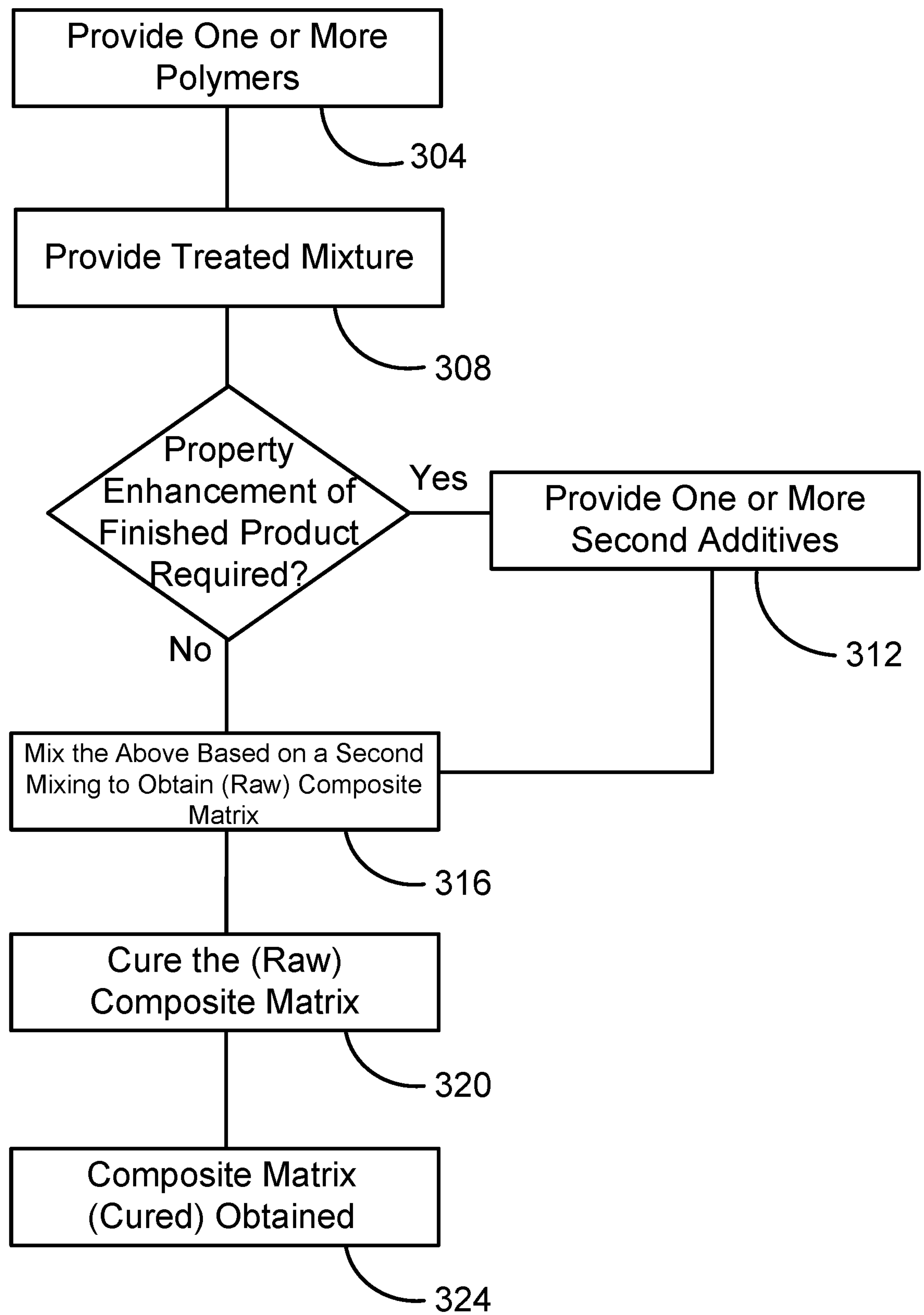
FIG. 4 is a flowchart illustrating the details of the step 300, where the raw and cured composite matrix is obtained.

FIG. 4 is a flowchart illustrating the details of step 300, wherein processing steps are carried out to obtain the raw and cured composite matrix. In steps 304 and 308, necessary ingredients are provided. In step 304, one or more polymers are provided. In the present process, a combination of two or more polymers can be used to form the base polymer matrix to modify specific properties, for example, to increase strength after curing. Examples of polymers that can be used in the present process include: polysiloxane (with substituents of methyl, trifluoropropyl, or phenyl), ethylene-propylene copolymer, ethylene-propylene-diene terpolymer, acrylonitrile-butadiene copolymer, styrene-butadiene copolymer, isoprene polymer, isobutylene-isoprene copolymer, chloroprene polymer, butadiene polymer, chlorinated polyethylene polymer, epichlorohydrin polymer, ethylene-acrylic copolymer, polyacrylate copolymers, ethylene-vinyl acetate copolymer, polypropylene oxide copolymer, fluorocarbon elastomer copolymers, tetrafluoroethylene copolymer, perfluoro-elastomer copolymer, polyether-urethane polymer, polyester-urethane polymer, silicone rubber base, fluorosilicone rubber base, vinyl terminated polydimethylsiloxane, ethylene propylene diene polymer, butadiene-acrylonitrile copolymer (39% ACN), other commercially available polymer or copolymer, and any combination thereof.

In step 308, the treated mixture in the as-generated form obtained in step 100 or in the pressed form obtained in step 200, is provided. In step 312, depending on the properties required in the finished product, other ingredients may be added to enhance the specific properties. Thus, the second mixing in step 316 can be carried out to mix one or more polymers and the treated mixture obtained according to the previous steps as illustrated in FIG. 2, with or without one or more additives, which are herein termed second additives. Examples of such second additives include fillers, plasticizers, stabilizers, cure initiators, cure modifiers, cure accelerators, catalysts, curatives, and any combination thereof. Examples of the fillers include: silica, fumed silica, nano silica, functionalized or un-functionalized silicone resins, natural and synthetic fibers, polysaccharides, cork, graphite and carbon black, graphene, clay, boron nitride, finely divided metal and metal oxides, and any combination thereof.

After the provisions of all the necessary ingredients in step 304-312 above, the ingredients are put in a second mixer and mixed therein in the second mixing step 316 of FIG. 4. The second mixer may be a conventional rubber processing mill or mixer with low shear rates of less than 100 l/s, resulting in the polymer-based mixture, i.e., as-processed, raw composite matrix before curing, with substantially debundled CNTs and other ingredients.

Figure 5:
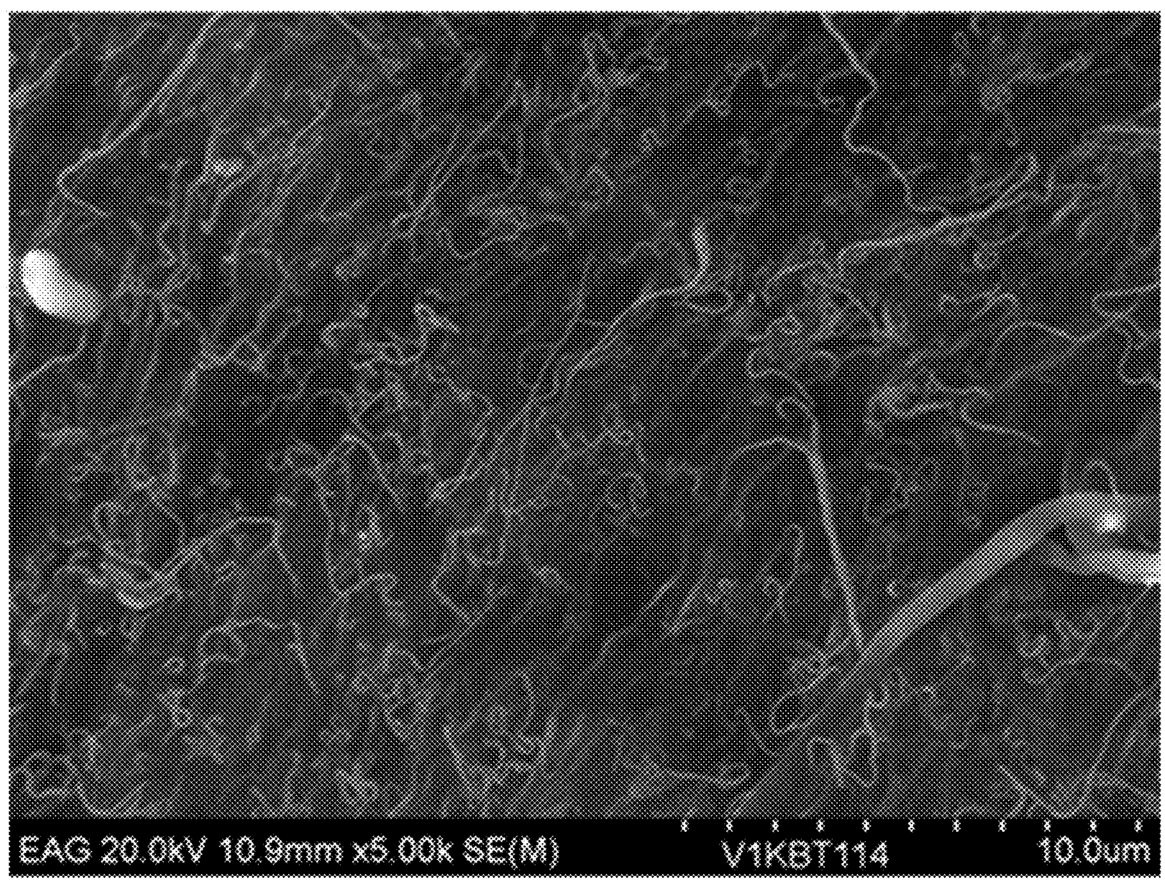
FIG. 5 is a photo of a scanning electron microscope image, showing an example of a silicone-based composite matrix including well-dispersed individual SWCNTs.

In step 320, the polymer-based mixture, i.e., raw composite matrix, generated by the above mixing is subject to a curing process, in which it is irreversibly hardened to produce a thermoset. In general, curing is induced by heat or suitable radiation and may be promoted by high pressure or mixing with a catalyst. The catalyst can be added in the second mixing step 316. For the present curing, a transition metal-based catalyst, which is synthesized from platinic chloride and chloroplatinic acid, may be used. Curing is based on chemical reactions that create extensive crosslinking between polymer chains to produce a substantially infusible and insoluble polymer network. Accordingly, the composite matrix with intended properties is stabilized and obtained in step 324. FIG. 5 is a scanning electron microscope image, showing an example of a silicone-based composite matrix including well-dispersed individual SWCNTs. The composite matrix can then undergo fabrication procedures, such as molding, calendaring, and extrusion, in step 400 of FIG. 1 as needed, to finally obtain the finished product in step 500 of FIG. 1.

Referring back to the pressing procedure in step 200 of FIG. 1, the pressing may include compression, pelletization, and other bulk density-increasing operations. An example of the pelletization procedure includes the use of a pelletizer that rolls the treated mixture into pellets. A binder such as cyclic polysiloxane may be added into the pelletizer. The resultant pellets are heated to remove the binder at temperatures below the activation temperatures of other additives in the treated mixture, i.e., first additives. After cooling, the pellets may be packaged for shipping. It should be noted, however, that the surfactant often works sufficiently to act as a binder. Thus, addition of a specific binder such as cyclic polysiloxane may not be necessary; accordingly, the follow-up processes of heating and cooling are not needed in this case. Instead of the pelletization, a light pressing, or tamping may be carried out to increase the bulk density. In general, shipping and handling of raw CNTs off-the-shelf, e.g., SWCNT powder, is inefficient in that its bulk density is extremely low, thereby occupying a large cargo space with light-weight raw CNTs.

Figures 6A, 6B:
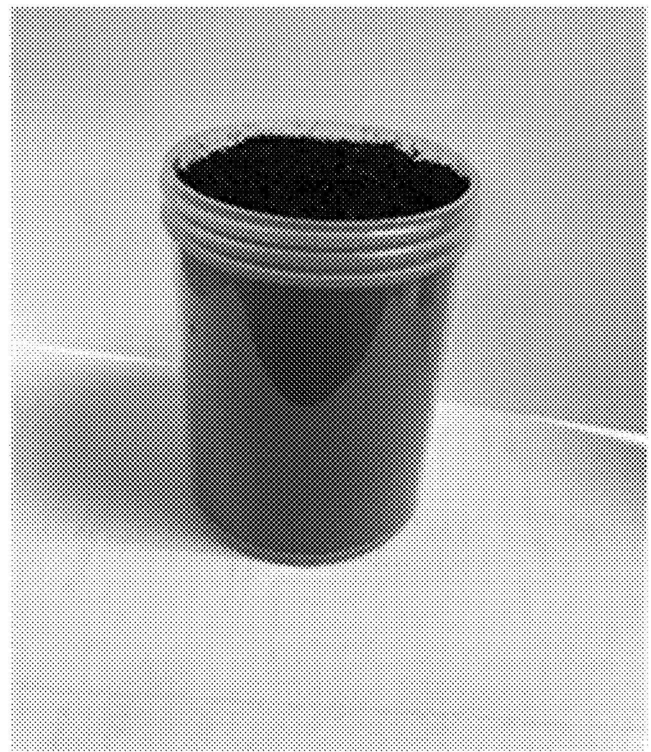
FIG. 6A is a photo showing an example of untreated, raw CNTs.
FIG. 6B is a photo showing an example of the treated mixture, after pressing.

FIG. 6A is a photo showing an example of untreated, raw CNTs, wherein the mass is 7.122 g, and the occupied volume is approximately 270 $cm^3$; hence, the bulk density is calculated to be approximately 26 $kg/m^3$. FIG. 6B is a photo showing an example of the treated CNTs, i.e., the treated mixture after pressing in step 200, wherein the mass is 19.339 g, the occupied volume is approximately 91 $cm^3$; hence, the bulk density is calculated to be approximately 213 $kg/m^3$. The pressing operation herein involves tamping or pressing with pressure manually or mechanically without additional binders, and achieves a compression factor of greater than 8 times, e.g., approximately 8.2.

Referring back to step 112 in FIG. 2, as mentioned earlier, one or more cure modifiers may be added in making the treated mixture. In the present study, hydrosilylation cure reactions in silicone rubber are optimized by maintaining the Si—H to vinyl stoichiometric balance. Imbalanced hydrosilylation cure systems produce either a condition of under-cure, which causes poor elastomeric properties, or alternatively over-cure, which causes undesirable adhesion to mold surfaces and other substrates. As described, hydride functional polysiloxanes form non-covalent interactions with CNTs; additionally, they are also hydrosilylation reaction precursors (described as crosslinkers). Consequently, a competition ensues between the cure reaction and the affinity of CNTs for crosslinker. This competition is subject to different rates of reaction and can interfere with the stoichiometric balance over time.

An additional issue comes to light when processing the composite matrix containing CNTs. As described, the composite matrix is optimized when carbon nanotubes are exfoliated from bundles of CNTs into separate, individual tubes. These individual tubes must also be fully encapsulated within the composite matrix. Any exposed CNTs, or uncured composite matrix containing CNTs, will impart an undesirable surface effect where the exposed tubes are removed by wear or abrasion, and lead to black marking of surfaces on contact. This is sometimes referred to as sloughing, as the CNTs produce a black, oil-like residue along the surface of the composite matrix.

To rectify the negative effects CNTs have on the composite matrix, the present study includes the use of cure modifiers comprised of a hydrosilylation reaction precursor which includes a hydrosilylation crosslinker and a reaction inhibitor, added in the treated mixture in the first mixing in step 116. The addition of crosslinker compensates for the absorption by way of the CNTs and balances the Si—H to vinyl stoichiometric ratio in the hydrosilylation reaction. The addition of inhibitor allows the composite matrix to be cured at higher temperatures without causing undesirable problems with scorch (defined as premature curing). These higher process temperatures afford a more expansive and complete crosslink formation, which in turn enables the polymer links to more fully encapsulate the individual CNTs. The surface of the composite matrix is clean and contains fully encapsulated CNTs. It has been reported that the hydrosilylation inhibitor blocks the activation of the transition metal catalyst synthesized from platinic chloride and chloroplatinic acid. These platinum divinyl tetramethyldisiloxane complexes, known as Karstedt catalyst complexes, are typically: platinum(0)-1,3-divinyl, 1,1,3,3-tetramethyldisiloxane), platinum(0)-2,4,6,8-tetramethyl-2,4,6,8-tetravinylcyclotetrasiloxane complex, bis(acetylacetonato)platinum, (m-cyclopentadienyl) trialkylplatinum complexes, platinum triazenido complexes, platinum, iron, palladium and rhodium complexes, or any combination thereof.

The following formulations exemplify how addition of a crosslinker and an inhibitor as the cure modifiers is done, specifically wherein a hydrosilylation reaction precursor comprised of a hydrosilylation crosslinker and a reaction inhibitor is used. Note that phr in the tables below is defined as parts per hundred rubber; the values in the formulations can be converted to a percentage by dividing the ingredient amount by the total amount and multiplying by 100.

Table 1 is a list of the phr values used for Formulation Example 1, which is a less optimal formulation example, resulting in a composite matrix characterized by a high degree of adhesion to a mold and other substrates, and poor CNT encapsulation (sloughing).

TABLE 1

| Ingredients: | $1^{st}$ Mixing (phr) | $2^{nd}$ Mixing (phr) | Combined $1^{st}$ + $2^{nd}$ Mixing (phr) |
|---|---|---|---|
| Methylvinyl Polydimethylsiloxane | 0 | 100 | 100.00 |
| Platinum catalyst | 0 | 0.20 | 0.20 |
| Carbon nanotubes | 3.15 | 0 | 3.15 |
| Inorganic surfactants | 4.76 | 0 | 4.76 |
| Crosslinker | 0 | 3.55 | 3.55 |
| Inhibitor | 0 | 0.28 | 0.28 |
| | | | 111.94 |

Table 2 is a list of the phr values employed for Formulation Example 2, which is a more optimal formulation example, resulting in a composite matrix characterized by low adhesion to a mold and other substrates and good CNT encapsulation.

TABLE 2

| Ingredients: | $1^{st}$ Mixing (phr) | $2^{nd}$ Mixing (phr) | Combined ($1^{st}$ + $2^{nd}$ Mixing) (phr) |
|---|---|---|---|
| Methylvinyl Polydimethylsiloxane | 0 | 100 | 100.00 |
| Platinum catalyst | 0 | 0.15 | 0.15 |
| Carbon nanotubes | 3.15 | 0 | 3.15 |
| Inorganic surfactants | 4.76 | 0 | 4.76 |
| Crosslinker | 0.73 | 0 | 0.73 |
| Inhibitor | 0.28 | 0.28 | 0.56 |
| | | | 109.35 |

In the above Tables 1 and 2, the column "1st Mixing" relates to step 116 of mixing the CNTs and the inorganic surfactants, with or without one or more first additives, for generating the treated mixture; the column "2nd Mixing" relates to step 316 of mixing the polymer and the treated mixture, with or without one or more second additives, for making the composite matrix; and the column "Combined 1st+2nd Mixing" lists the combined total of all the ingredients in both the 1st mixing and the 2nd mixing.

In the "Combined 1st+2nd Mixing" column in Table 2, the level of the crosslinker was lowered from 3.55 phr to 0.73 phr and added only in the 1st mixing, while the level of the inhibitor was increased from 0.28 phr to 0.56 phr with a half of it being added to each of the 1st and 2nd mixing. The present experiments show that the cure modifier added in this sequence, first in the 1st mixing, as part of the treated mixture, better maintains the stoichiometric balance of Si—H to vinyl and allows for improved CNT encapsulation in the resultant composite matrix.

To further show the change in cured properties due to the hydrosilylation reaction precursor of the cure modifier, the table below shows how the addition of the cure modifier in the 1st mixing changes the time to begin curing (TS2) and the time to cure completion (TC90). These cure speeds are directly related to cure efficiency. In general, the cure efficiency tends to decrease when CNTs are included in the mixing. One solution to this problem is to add the cure modifier in the 2nd mixing as in the formulation example in Table 1 above; however, this often results in a composite matrix with a high degree of adhesion to a mold and other substrates, and poor CNT encapsulation (sloughing). A preferred method is to add the cure modifier in the 1st mixing as in Table 2. Table 3 below shows that the cure efficiency improves when the cure modifier is added in this manner, wherein the cure speeds get close to the values in the case of "Without Treated CNT Mixture," e.g., TS2=30 sec and TC90=66 sec (at 177° C.). Specifically, the levels of crosslinker and inhibitor of the cure modifier in the 1st mixing can be adjusted to bring the cure efficiency back for providing a high throughput, thereby achieving economically-produced composite matrices.

TABLE 3

| Formulation Basis | Si—H/ Vinyl Ratio | Inhibitor Level | TS2 (s) | TC90 (s) | Cure Temperature (° C.) |
|---|---|---|---|---|---|
| Without Treated CNT Mixture | 1.2 | High | 30 | 66 | 177 |
| With 55% Treated CNT Mixture | 1.2 | High | 50 | 121 | 177 |
| With 55% Treated CNT Mixture | 1.4 | High | 50 | 149 | 177 |
| With 55% Treated CNT Mixture | 1.6 | High | 28 | 99 | 177 |
| With 55% Treated CNT Mixture | 1.9 | High | 34 | 86 | 177 |
| With 55% Treated CNT Mixture | 3.2 | Low | 15 | 97 | 160 |
| With 55% Treated CNT Mixture | 1.2 | High | 93 | 196 | 160 |

Figure 7A:
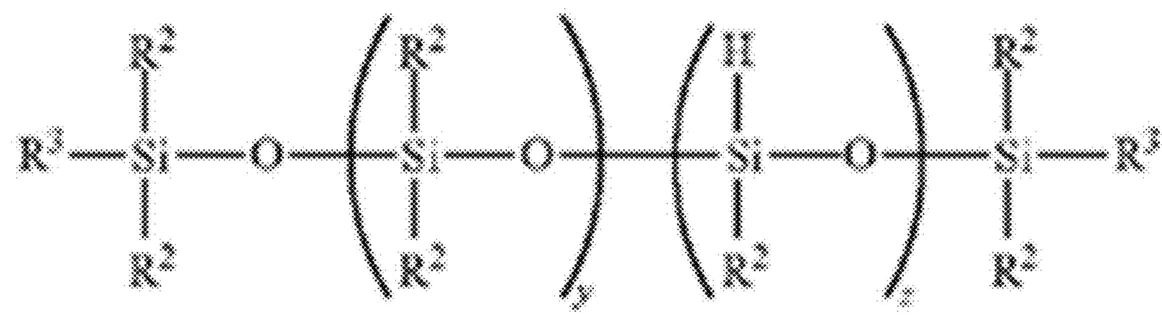
FIGS. 7A and 7B illustrate generalized molecular descriptions of a hydrosilylation reaction precursor having a straight chain organohydrogen polysiloxane and a hydrosilylation reaction precursor based on an inhibitor such as an acetylenic alcohol, respectively.

The composition of a cure modifier may include a hydrosilylation reaction precursor having a straight chain organohydrogen polysiloxane, a generalized molecular description of which is illustrated in FIG. 7A, where y is an integer of 1 to 98 and z is an integer of 2 to 50 with the proviso y+z is 9 to 100, R2 is independently an optionally substituted monovalent hydrocarbon group containing 1 to 10 carbon atoms, and R3 is R2 or a hydrogen atom.

Figure 7B:
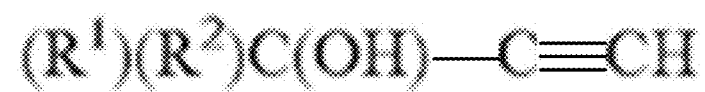

FIG. 7B illustrates a generalized molecular description of another hydrosilylation reaction precursor based on an inhibitor such as an acetylenic alcohol, where the substituents R1 and R2, which are identical or different, represent, independently of each other, a linear or branched monovalent alkyl group, a cycloalkyl group, a (cycloalkyl)alkyl group, an aromatic group or an arylalkyl group, and they may be bonded two by two so as to form a 5-, 6-, 7- or 8-membered aliphatic ring optionally substituted with one or more substituents.

In the present study, various experiments have been conducted to generate composite matrices by using the above-described method based on incorporation of CNTs, and their characteristics and properties are analyzed to understand the effects arising from the CNTs and various additives. The results and special technical features are described below with reference to FIGS. 8-26.

Two types of treated mixtures, Treated Mixture 1 and Treated Mixture 2, are generated based on the first mixing, as explained earlier with reference to FIG. 2. FIGS. 8 and 9 are tables listing the ingredients used to generate Treated Mixture 1 and Treated Mixture 2, respectively. The weight percent (wt %) of each ingredient in the treated mixture is shown in the rightmost column in each table. Here, SWCNT powder with a carbon purity of 99% or higher is used as the CNT; the terms CNT and SWCNT are used interchangeably in the tables and charts in FIGS. 8-26. Carbon black and glass bubbles are used as the first additives to generate both Treated Mixtures 1 and 2. Treated Mixture 1 includes 30 wt % of one type of inorganic surfactant; Treated Mixture 2 includes 10 wt % each of three types of inorganic surfactants.

The treated mixture generated based on the first mixing is then mixed with one or more polymers and second additives based on the second mixing to generate a polymer-based mixture, i.e., composite matrix (as-processed/raw), which may be is cured to generate composite matrix in the present experiments, as explained earlier with reference to FIG. 4. Fabrication procedures such as molding, calendering, and extrusion are then taken as needed to process the composite matrix to generate a final product, which in this case is a rubber product. FIGS. 10-13 are tables listing the ingredients used in the second mixing, other than the treated mixture, for generating a base silicone rubber, a base fluorosilicone rubber, a base EPDM rubber, and a base nitrile rubber, respectively. That is, each of FIGS. 10-13 is a table showing a base rubber formulation including one or more polymers and second additives, which is to be mixed with the treated mixture in the second mixing for generating a composite matrix. The weight percent of each ingredient in the base rubber is shown in the rightmost column in each table.

FIGS. 14-20 are tables listing the experimental results related to electrical, physical, and rheological properties of various base rubbers and composite matrices (with Treated Mixture 1 or 2). The rheological properties are shown in terms of ML (minimum torque), MH (maximum torque), TS2 (time to begin curing), and TC90 (time to cure completion).

FIG. 14 includes formulation details for the base silicone rubber and the silicone composite matrices obtained by mixing the base silicone rubber formulation and Treated Mixture 1 with the effective SWCNT weight percent of 1 wt %, 2 wt %, and 3 wt %, respectively. FIG. 15 includes formulation details for the base silicone rubber and the silicone composite matrices obtained by mixing the base silicone rubber formulation and Treated Mixture 2 with the effective SWCNT weight percent of 1 wt %, 2 wt %, and 3 wt %, respectively. Here, the effective weight percentage is the weight percentage of the ingredient in the total weight of all the ingredients for each composite matrix.

FIG. 16 includes formulation details for the base silicone rubber and the silicone composite matrices obtained by mixing the base silicone rubber formulation and raw SWCNT without the treatment (i.e., no first mixing with one or more inorganic surfactants), with the effective SWCNT weight percent of 1 wt %, 2 wt %, and 3 wt %, respectively.

FIG. 17 includes formulation details for the base silicone rubber and the silicone composite matrices obtained by mixing the base silicone rubber formulation and raw SWCNT plus raw carbon black without the treatment (i.e., no first mixing with one or more inorganic surfactants), with 1 wt % raw SWCNT plus 3.1 wt % raw carbon black, and 2 wt % raw SWCNT plus 7.1 wt % raw carbon black (CB), respectively.

FIG. 18 includes formulation details for the base fluorosilicone rubber and the fluorosilicone composite matrices obtained by mixing the base fluorosilicone rubber formulation and Treated Mixture 1, with the effective SWCNT weight percent of 1 wt %, 2 wt %, and 3 wt %, respectively.

FIG. 19 includes formulation details for the base EPDM rubber and the EPDM composite matrices obtained by mixing the base EPDM rubber formulation and Treated Mixture 1, with the effective SWCNT weight percent of 0.9 wt %, 1.7 wt %, and 3 wt %, respectively.

FIG. 20 includes formulation details for the base nitrile rubber and the nitrile composite matrices obtained by mixing the base nitrile rubber formulation and Treated Mixture 1, with the effective SWCNT weight percent of 0.9 wt %, 2 wt %, and 3 wt %, respectively.

FIGS. 21-26 are charts showing key features and trends of the properties based on the data compiled in FIGS. 14-20. Note that CNT wt % in these charts are equivalent to effective wt % of SWCNT in the tables in FIGS. 14-20.

Figure 21:
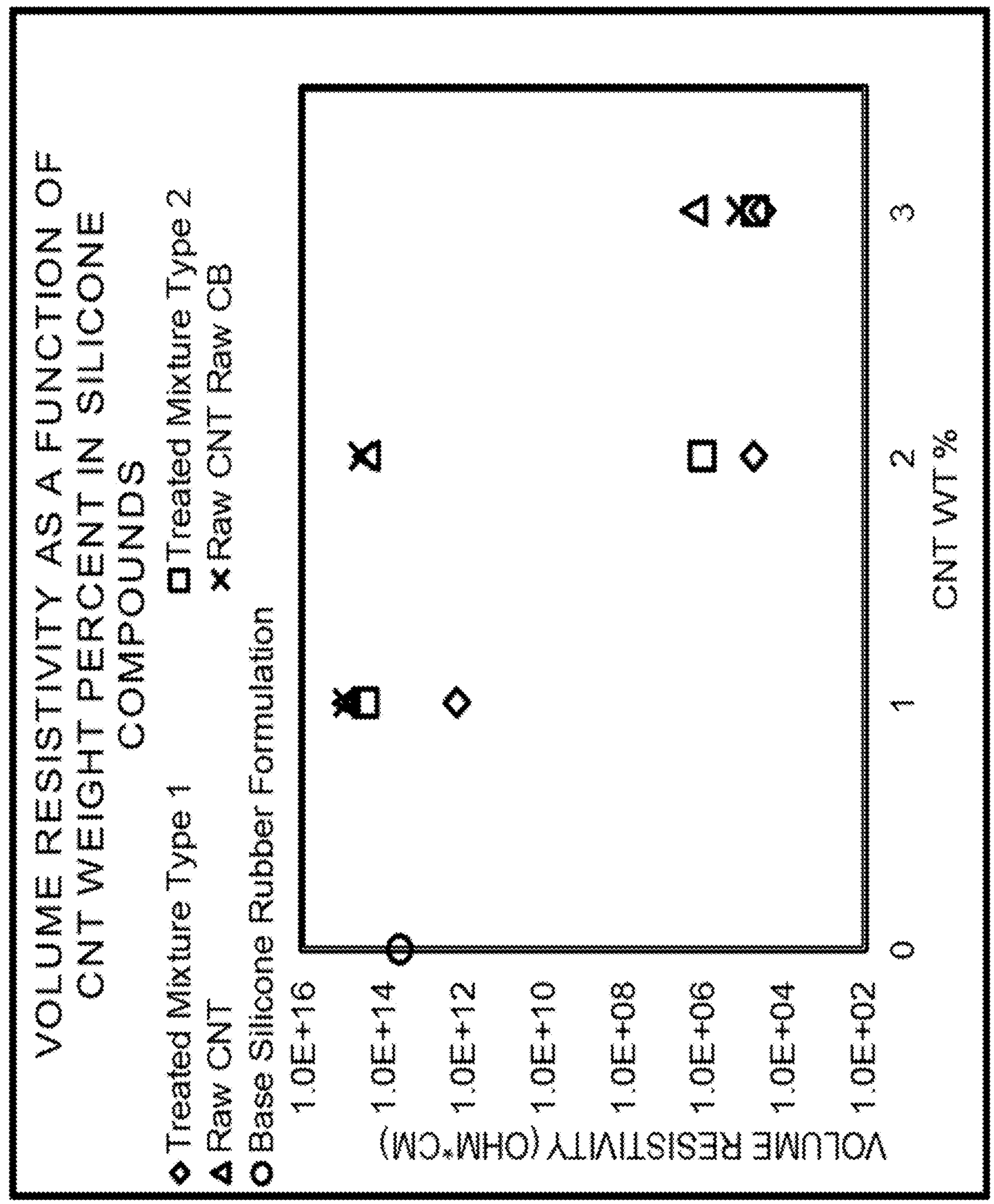
FIGS. 21-26 are charts showing key features and trends of the properties based on the data compiled in FIGS. 14-20.
Figure 22:
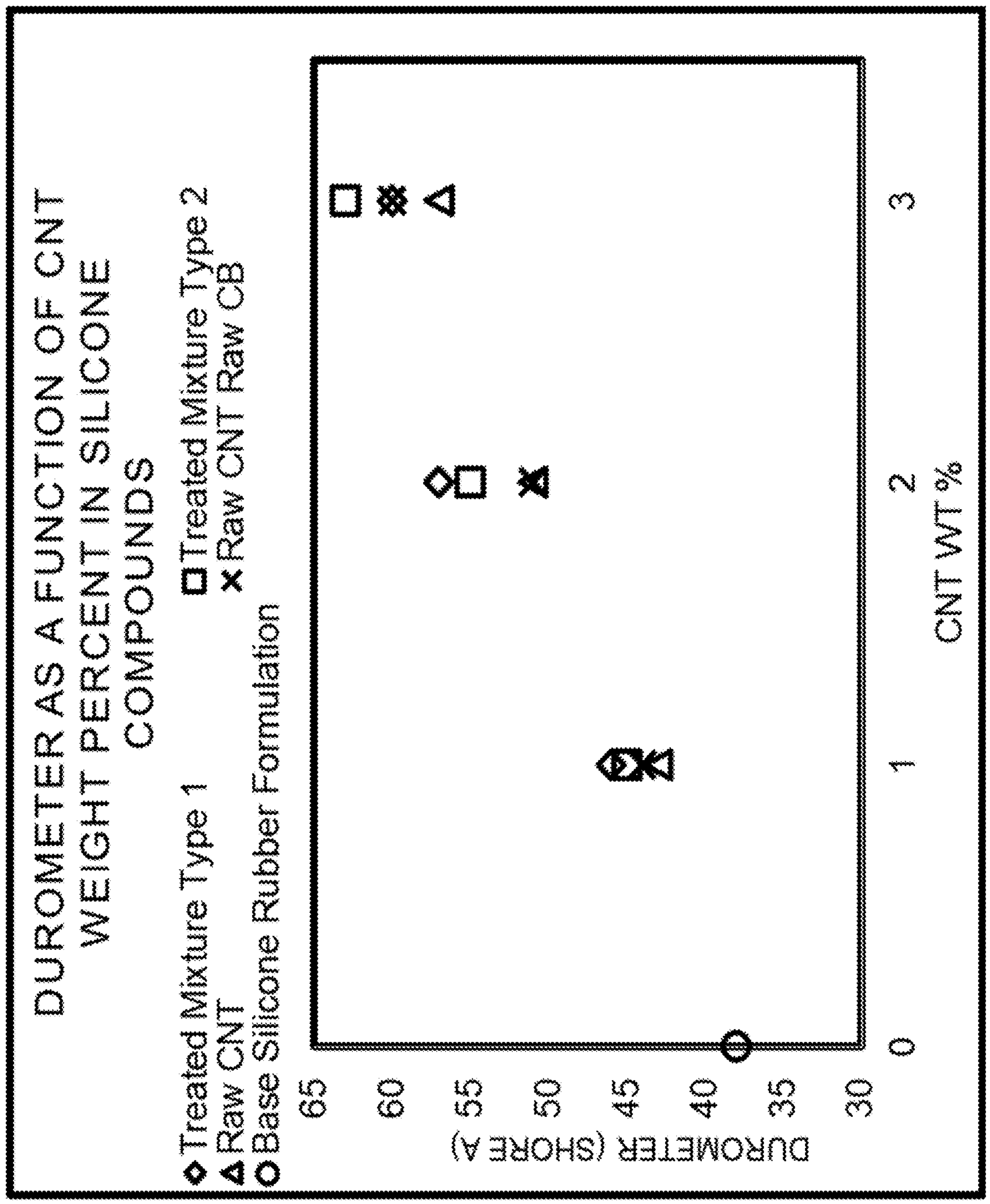

FIG. 21 is a chart showing volume resistivity as a function of CNT weight percent in the silicone composite matrices including Treated Mixture 1, Treated Mixture 2, raw CNT, and raw CNT plus raw carbon black (CB), and the base silicone rubber based on the base silicone rubber formulation, respectively. At equivalent weight percentages of CNT and of CB, both the silicone composite matrices including Treated Mixture 1 and Treated Mixture 2 exhibit a lower volume resistivity when compared to either of the silicone composite matrix including raw CNT and the silicone composite matrix including raw CNT plus raw CB. It is shown also that the electrical percolation threshold for both the silicone composite matrices including Treated Mixture 1 and Treated Mixture 2 is met at a lower weight percentage of CNT than either of the silicone composite matrix including raw CNT and the silicone composite matrix including raw CNT plus raw CB. It can also be seen that the carbon black added in the treated mixture functions synergistically with the CNTs to bridge electron transport pathways and enhance the electrically conductive network in the composite matrix, more than in the case of including only CNTs. Furthermore, the partitioning agent, e.g., glass bubbles, added in the treated mixture improves the distribution uniformity of the CNTs, thereby enhancing the electrical conductivity in the composite matrices such as rubber compounds FIG. 22 is a chart showing durometer as a function of CNT weight percent in the silicone composite matrices including Treated Mixture 1, Treated Mixture 2, raw CNT, and raw CNT plus raw carbon black (CB), and the base silicone rubber based on the base silicone rubber formulation, respectively. Typical rubber applications fall within a durometer range of 40 to 70 Shore A. Referencing FIGS. 21 and 22, both the silicone rubber compounds including Treated Mixture 1 and Treated Mixture 2 exhibit a durometer within this desirable range, while also meeting the electrical percolation threshold at a lower weight percentage of CNT when compared to either of the silicone composite matrix including raw CNT and the silicone rubber compound including raw CNT plus raw CB.

Figure 23:
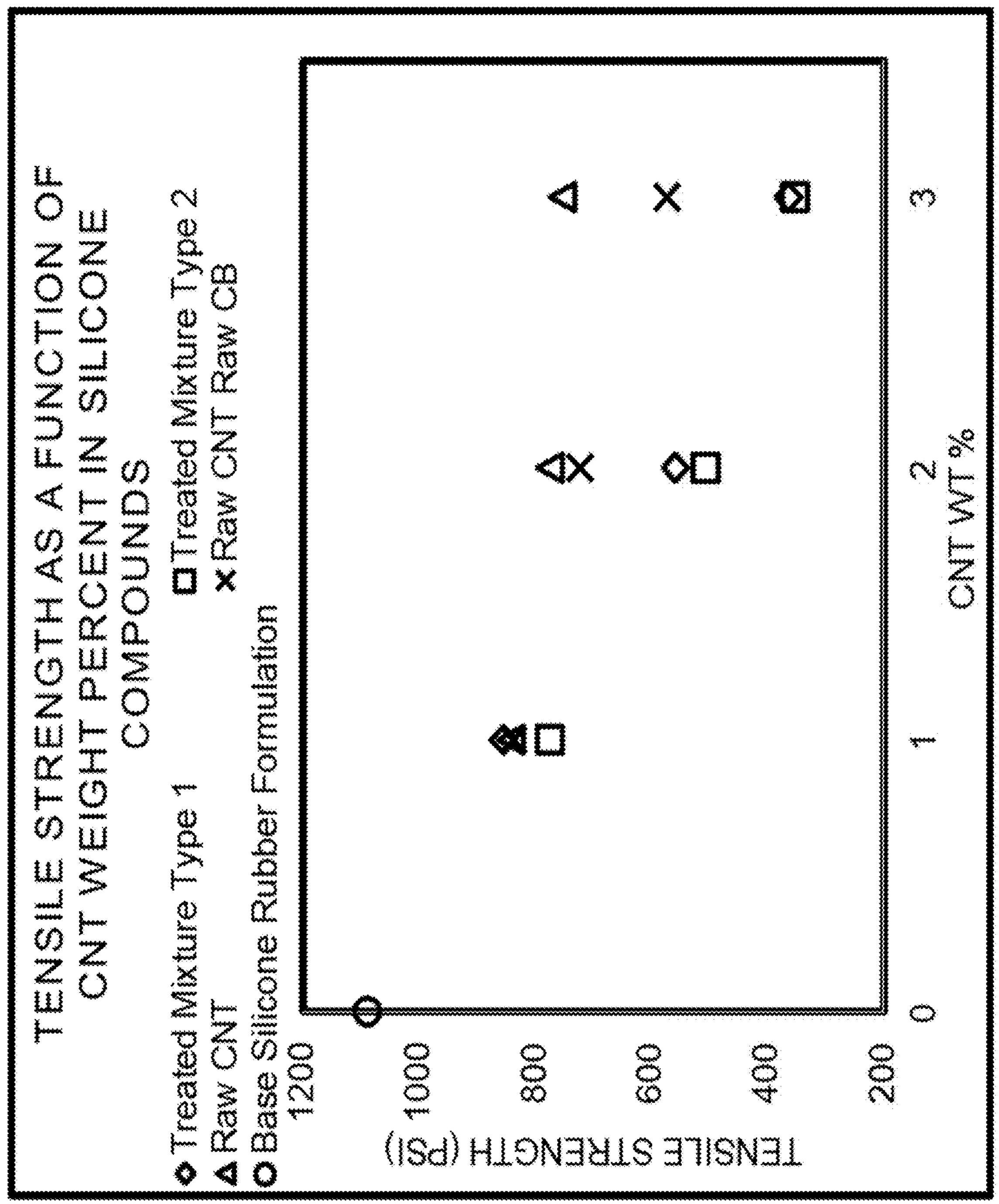

FIG. 23 is a chart showing tensile strength as a function of CNT weight percent in the silicone composite matrices including Treated Mixture 1, Treated Mixture 2, raw CNT, and raw CNT plus raw carbon black (CB), and the base silicone rubber based on the base silicone rubber formulation, respectively. Referencing FIGS. 21 and 23, both the silicone composite matrices including Treated Mixture 1 and Treated Mixture 2 meet the electrical percolation threshold at a lower weight percentage of CNT than either of the silicone composite matrix including raw CNT and the silicone composite matrix including raw CNT plus raw CB, while maintaining an appreciable tensile strength. Typically, many rubber applications seeking an electrically conductive material do not prioritize tensile strength as a necessary feature; a 400 psi tensile strength is often considered to be sufficient for these applications.

Figure 24:
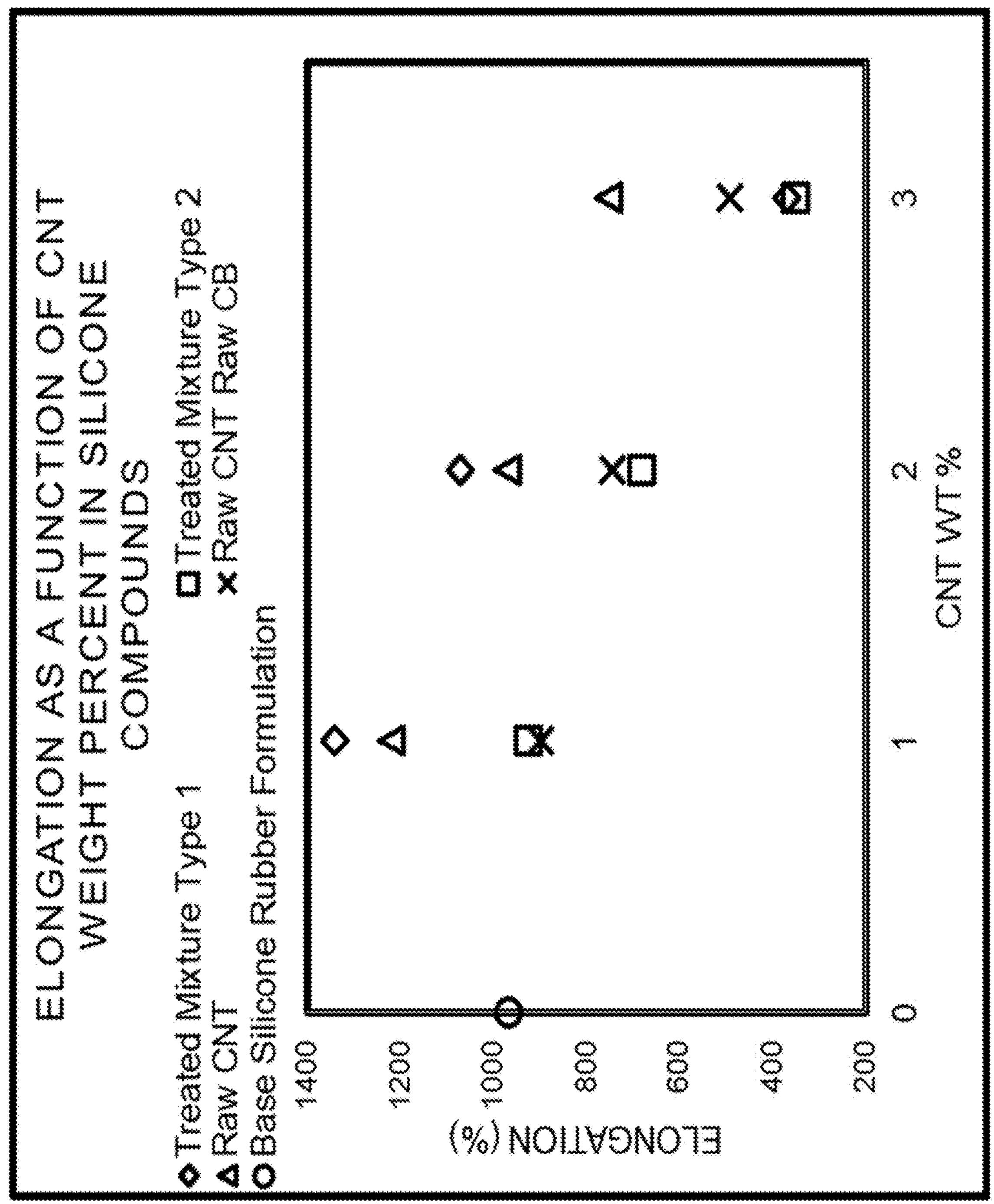

FIG. 24 is a chart showing elongation at break as a function of CNT weight percent in the silicone composite matrices including Treated Mixture 1, Treated Mixture 2, raw CNT, and raw CNT plus raw carbon black (CB), and the base silicone rubber based on the base silicone rubber formulation, respectively. The silicone composite matrix including Treated Mixture 1 exhibits enhanced elastomeric properties compared to the other cases. For example, referencing FIGS. 21 and 24, at 2 wt % CNT, the silicone composite matrix including Treated Mixture 1 shows the lowest volume resistivity (highest electrical conductivity) and the highest elongation at break. In the range between 0 wt % CNT and 3 wt % CNT, including 1 wt % CNT and 2 wt % CNT, the silicone composite matrix including Treated Mixture 1 exhibits the highest elongation at break. It can also be seen that the partitioning agent, e.g., glass bubbles, added in the treated mixture improves the distribution uniformity of the CNTs, thereby enhancing the mechanical properties in the composite matrices.

Figure 25:
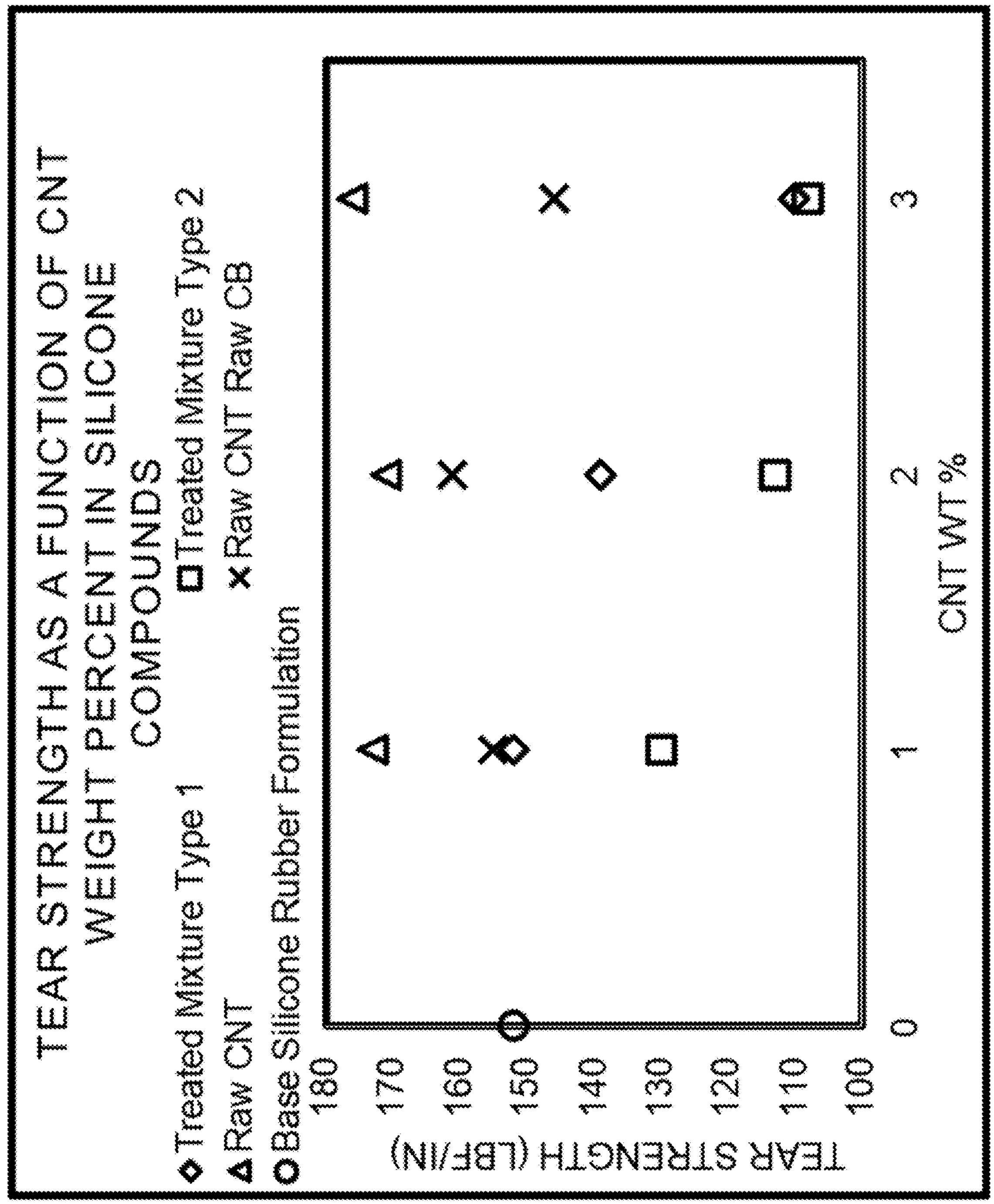

FIG. 25 is a chart showing tear strength as a function of CNT weight percent in the silicone composite matrices including Treated Mixture 1, Treated Mixture 2, raw CNT, and raw CNT plus raw carbon black (CB), and the base silicone rubber based on the base silicone rubber formulation, respectively. The silicone composite matrix including Treated Mixture 1 exhibits a tear strength comparable to the base silicone rubber at 1 and 2 wt % CNT. Referencing FIGS. 1 and 25, this tear strength is not significantly compromised at the CNT weight percentage necessary to meet the electrical percolation threshold.

Figure 26:
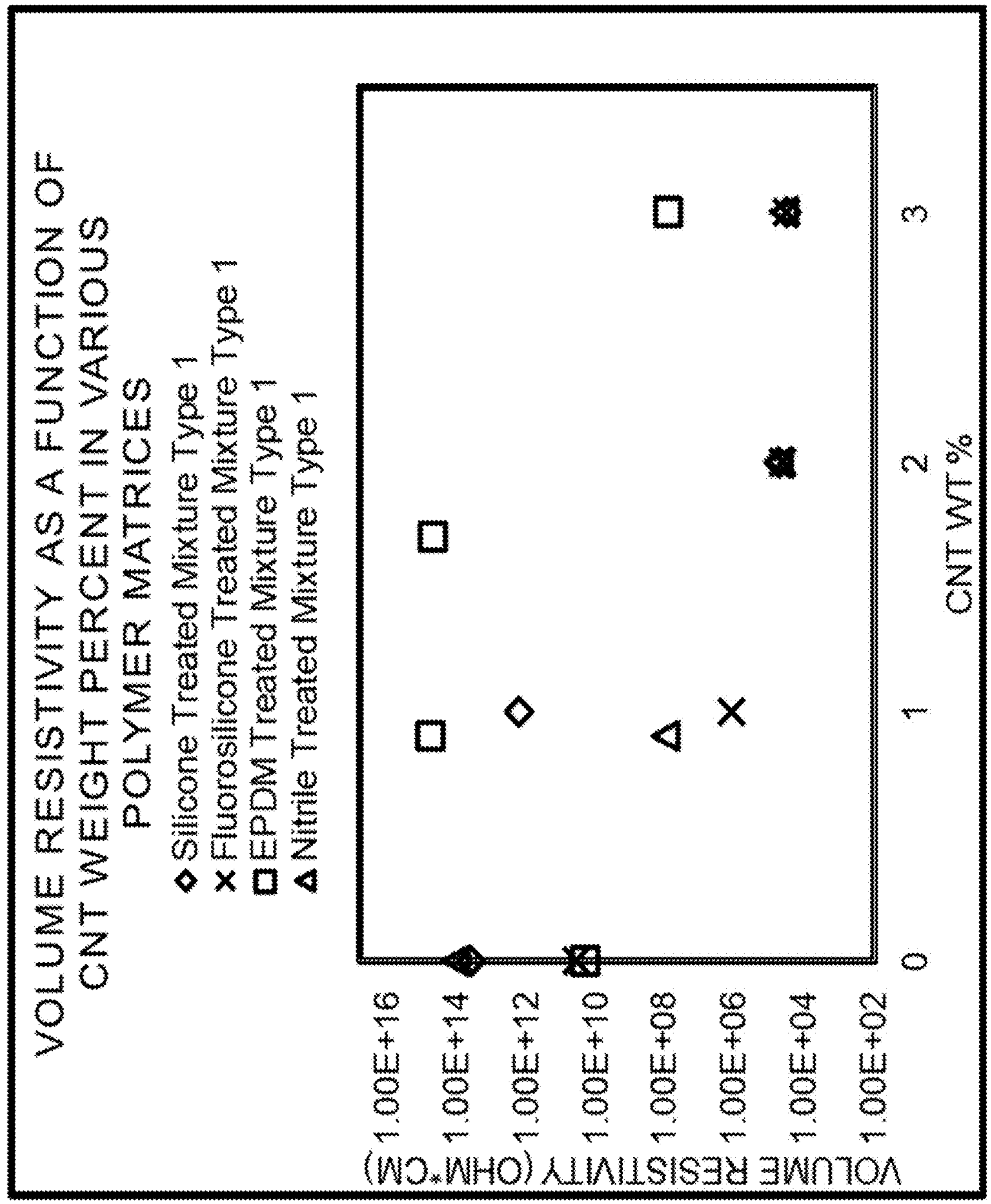

FIG. 26 is a chart showing volume resistivity as a function of CNT weight percent in the silicone composite matrices including Treated Mixture 1, the fluorosilicone composite matrix including Treated Mixture 1, the EPDM composite matrix including Treated Mixture 1, and the nitrile composite matrix including Treated Mixture 1, respectively. When employing the method described herein and using Treated Mixture 1, the silicone, fluorosilicone, and nitrile composite matrices all pass through the electrical percolation threshold between 0 and 2 wt % CNT; on the other hand, the EPDM composite matrix passes through the electrical percolation threshold between 2 and 3 wt % CNT.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A method of making a composite matrix, the method comprising:

first mixing ingredients comprising carbon nanotubes (CNTs) and one or more inorganic surfactants to generate a treated mixture, the first mixing configured to have a shear rate at a range of 100-100,000 l/s, wherein the one or more inorganic surfactants comprise moieties characterized by capability to interact with surfaces of the CNTs to penetrate interstices of bundled CNTs, thereby facilitating exfoliation and debundling of the bundled CNTs;

second mixing ingredients comprising the treated mixture and one or more polymers to generate a composite matrix.

2. The method of claim 1, wherein the first mixing uses a cone mixer or a pin mixer.

3. The method of claim 1, wherein the second mixing uses a rubber mixing mill or mixer.

4. The method of claim 1, wherein the moieties comprise at least one moiety selected from the group consisting of a methyl group, a hydroxyl group, a silanol group, an aryl group, and combinations thereof.

5. The method of claim 1, wherein the one or more inorganic surfactants comprising at least one inorganic surfactant selected from the group consisting of a vinyl terminated polydimethylsiloxane, a vinyl terminated diphenylsiloxane dimethylsiloxane, a silanol terminated polydimethylsiloxane, a hydride terminated polyphenyl-(dimethylhydrosiloxy) siloxane, a hydride terminated polyphenylmethylsiloxane, a hydride terminated polyphenyl-(dimethylsiloxy) siloxane, and combinations thereof.

6. The method of claim 5, wherein the one or more inorganic surfactants comprise a silanol terminated polydimethylsiloxane.

7. The method of claim 1, wherein the first mixing mixes ingredients further comprising one or more first additives to generate the treated mixture.

8. The method of claim 7, wherein the one or more first additives comprising one or more cure modifiers.

9. The method of claim 8, wherein the one or more cure modifiers comprising at least one cure modifier selected from the group consisting of a hydrosilylation reaction precursor, a peroxide reaction precursor, a sulfur reaction precursor, and combinations thereof.

10. The method of claim 8, wherein the one or more cure modifiers comprising a hydrosilylation reaction precursor, wherein the hydrosilylation reaction precursor comprising a hydrosilylation crosslinker and a reaction inhibitor.

11. The method of claim 7, wherein the one or more first additives comprising a carbon black.

12. The method of claim 7, wherein the one or more first additives comprising a partitioning agent.

13. The method of claim 12, wherein the partitioning agent comprise any of glass beads, glass bubbles, or electrically conductive metal powders.

14. The method of claim 7, wherein the one or more first additives comprising a concentrating agent or a blowing agent.

15. The method of claim 14, wherein the blowing agent comprises a foaming agent or composites containing expandable cells for increasing void spaces.

16. The method of claim 1, wherein the second mixing mixes ingredients further comprising one or more second additives to generate the composite matrix.

17. The method of claim 16, wherein the one or more second additives comprising at least one second additive selected from the group consisting of a filler, a plasticizer, a stabilizer, a cure initiator, a cure modifier, a cure accelerator, a catalyst, a curative, and combinations thereof.

18. The method of claim 17, wherein the filler comprising at least one filler selected from the group consisting of silica, fumed silica, nano silica, silicone resin, natural and synthetic fiber, polysaccharide, cork, graphite, carbon black, graphene, clay, boron nitride, metal powder, metal oxide powder, and combinations thereof.

19. The method of claim 16, wherein the one or more second additives comprising one or more cure modifiers; and wherein the first mixing mixes ingredients further comprising one or more first additives to generate the treated mixture, and wherein the one or more first additives comprising one or more cure modifiers.

20. The method of claim 19, wherein the one or more cure modifiers comprising a reaction inhibitor, wherein the one or more cure modifiers included as the one or more second additives;

and wherein the one or more cure modifiers comprising a hydrosilylation reaction precursor, wherein the hydrosilylation reaction precursor comprising a hydrosilylation crosslinker and the reaction inhibitor, wherein the one or more cure modifiers included as the one or more first additives.

21. The method of claim 1, wherein the one or more polymers comprising at least one polymer selected from the group consisting of: polysiloxane with substituents, wherein the substituents comprise any of methyl, trifluoropropyl, phenyl, or combinations thereof; ethylene-propylene copolymer; ethylene-propylene-diene terpolymer; ethylene-propylene-diene polymer; acrylonitrile-butadiene copolymer; styrene-butadiene copolymer; isoprene polymer; isobutylene-isoprene copolymer; chloroprene polymer; butadiene polymer; chlorinated polyethylene polymer; epichlorohydrin polymer; ethylene-acrylic copolymer; polyacrylate copolymer; ethylene-vinyl acetate copolymer; polypropylene oxide copolymer; fluorocarbon elastomer copolymer; tetrafluoroethylene copolymer; perfluoroelastomer copolymer; polyether-urethane polymer; polyester-urethane polymer; silicone rubber base; fluorosilicone rubber base; vinyl terminated polydimethylsiloxane; ethylene propylene diene polymer; butadiene-acrylonitrile copolymer with 39% acetonitrile; and combinations thereof.

22. The method of claim 1, wherein the CNTs comprising at least 99% of single-walled carbon nanotubes (SWCNTs) in powder form.

23. The method of claim 1, further comprising:

pressing the treated mixture after the first mixing.

24. The method of claim 23, wherein the pressing comprising tamping to increase a bulk density of the treated mixture by greater than 8 times compared to bulk density of untreated CNTs.

25. The method of claim 1 further comprising curing the composite matrix.

26. The method of claim 1, wherein the second mixing configured to have a shear rate below 100 l/s.

27. The method of claim 1, wherein the CNTs comprising at least one type of CNTs selected from the group consisting of single-walled carbon nanotubes (SWCNTs), double-walled carbon nanotubes (DWCNTs), and multi-walled carbon nanotubes (MWCNTs).

28. The method of claim 1 further comprising curing the composite matrix obtaining an electrically conductive material.

29. The method of claim 11, wherein the carbon black comprises acetylene-based carbon black.

* * * * *